(12) United States Patent
Jiang et al.

(10) Patent No.: US 11,044,691 B2
(45) Date of Patent: *Jun. 22, 2021

(54) METHOD AND DEVICE IN UE, BASE STATION AND SERVICE CENTER

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/907,327

(22) Filed: Jun. 22, 2020

(65) Prior Publication Data

US 2020/0322913 A1 Oct. 8, 2020

Related U.S. Application Data

(63) Continuation of application No. 16/416,282, filed on May 20, 2019, now Pat. No. 10,757,673, which is a
(Continued)

(30) Foreign Application Priority Data

Nov. 20, 2016 (CN) .......................... 201611033145.7

(51) Int. Cl.
*H04W 64/00* (2009.01)
*G01S 5/10* (2006.01)
(Continued)

(52) U.S. Cl.
CPC ............... *H04W 64/00* (2013.01); *G01S 5/10* (2013.01); *H04B 7/0413* (2013.01); *H04W 4/02* (2013.01); *H04W 24/10* (2013.01)

(58) Field of Classification Search
CPC ....... H04W 64/00; H04W 4/02; H04W 24/10; H04W 76/19; H04W 76/27;
(Continued)

(56) References Cited

U.S. PATENT DOCUMENTS 10,757,673 B2 * 8/2020 Jiang ..................... H04W 24/10
2008/0260054 A1 10/2008 Myung et al.
2011/0190005 A1 8/2011 Cheon et al.

FOREIGN PATENT DOCUMENTS

CN 102550122 A 7/2012
CN 103856894 A 6/2014
(Continued)

OTHER PUBLICATIONS

ISR received in application No. PCT/CN2017/108045 dated Jan. 9, 2018.
(Continued)

*Primary Examiner* — Nimesh Patel

(57) ABSTRACT

A method and device for a user equipment, a base station and a service center is disclosed; the UE transmits first information, then receives X1 first signals and transmits a first measurement report; first information is used to determine X1 first antenna port(s); first measurement report includes K1 piece(s) of measurement information, and each of K1 piece(s) of measurement information is for one of X1 first signals; measurement information is used to determine at least the first two of the corresponding set of time length, first antenna port, or first angle; By designing first information and first measurement report, feedback information of beam selection is used to determine generation and transmission of positioning reference signal under the condition of the base station and the UE supporting beamforming, utilizing beamforming has strong directional characteristics to improve the accuracy of UE positioning.

20 Claims, 12 Drawing Sheets

Related U.S. Application Data continuation of application No. PCT/CN2017/108045, filed on Oct. 27, 2017.

(51) Int. Cl.
*H04W 24/10* (2009.01)
*H04B 7/0413* (2017.01)
*H04W 4/02* (2018.01)

(58) Field of Classification Search
CPC ............. H04W 36/0055; H04W 76/38; H04W 74/0833; H04W 36/32; H04W 4/70; H04W 36/0083; H04W 36/0094; H04W 4/023; H04W 36/0058; H04W 36/00837; H04W 36/08; H04W 36/245; H04W 28/0226; H04W 36/0016; H04W 36/0077; H04W 36/0088; H04W 4/50; H04W 48/20; H04W 88/02; H04W 16/14; H04W 48/16; H04W 24/08; H04W 72/0433; H04W 72/085; H04W 36/0066; H04W 72/0413; H04W 36/0085; H04W 48/00; H04W 4/029; H04W 52/0245; H04W 52/18; H04W 52/22; H04W 72/1226; H04W 52/42; H04W 48/02; H04W 24/02; H04W 72/082; H04W 16/18; H04W 16/28; H04W 84/18; H04W 16/24; H04W 52/0251; H04W 4/027; H04W 88/06; H04W 36/00835; H04W 36/24; H04W 52/244; H04W 84/042; H04W 84/045; H04W 36/0072; H04W 52/0287; H04W 88/16; H04W 56/0015; H04W 72/0406; H04W 84/005; H04W 88/04; H04W 92/10; H04B 7/0413; H04B 7/0626; H04B 7/0617; H04B 7/024; H04B 17/309; H04B 7/0868; H04B 7/0408; H04B 7/0456; H04B 17/24; H04B 17/318; H04B 17/29; H04B 7/0602; H04B 7/0619; H04B 7/0684; H04B 7/0695; H04B 7/0808; H04B 7/0825; H04B 7/0874; H04B 7/088; H04B 17/382; H04B 1/0483; H04B 1/3833; H04B 7/0632; H04B 7/0417; H04B 7/0452; H04B 7/0897; H04B 10/07953; H04B 1/10; H04B 1/1027; H04B 1/525; H04B 17/27; H04B 17/327; H04B 17/345; H04B 7/15507; H04B 7/2606; G01S 5/10; G01S 3/043; G01S 3/46; G01S 3/48; G01S 5/021; G01S 5/02; G01S 5/0236; G01S 5/0036; G01S 19/42; G01S 1/20; G01S 2205/008; G01S 5/0009; G01S 5/0018; G01S 5/0054; G01S 5/0063; G01S 5/0257; G01S 5/0252; G01S 1/028; G01S 1/045; G01S 5/06; G01S 5/0278; G01S 13/878; G01S 1/02; G01S 13/003; G01S 19/48; G01S 2013/466; G01S 2013/468; G01S 5/0263; G01S 5/0268; G01S 5/0289; Y02D 70/1242; Y02D 70/1262; Y02D 70/1264; Y02D 70/142; Y02D 70/21; Y02D 70/144; Y02D 70/122; Y02D 70/444; Y02D 70/24; Y02D 70/146; Y02D 70/164; Y02D 70/23; Y02D 70/26; Y02D 70/25; H04L 47/122; H04L 41/0893; H04L 1/1887; H04L 1/1896; H04L 5/00; H04L 5/0035; H04L 5/0094; H04L 5/0057; H04L 5/0073; H04L 63/0435; H04L 63/0442; H04L 63/061; H04L 63/0823; H04L 63/0861; H04L 27/2613; H04L 5/0023; H04L 5/0058; H04L 5/0098; H04L 1/0026; H04L 25/0224; H04L 5/0007; H04L 5/0016; H04L 5/0025; H04L 27/26; H04L 5/0048; H04L 2209/80; H04L 41/0803; H04L 41/0823; H04L 41/145; H04L 43/08; H04L 63/10; H04L 1/04; H04L 1/06; H04L 5/22; H04L 41/0645; H04L 5/005; H04L 1/0015; H04L 5/14; H04L 5/1469; H04L 5/16; H04L 67/18; H04L 1/0001; H04J 11/00; H04J 11/0069; H04J 11/0023; H01Q 1/243; H01Q 1/246; H01Q 21/24; H01Q 13/28; H01Q 23/00; H01Q 3/12; G06Q 20/1235; G06Q 20/32; G06Q 20/405; G06Q 30/0261; H04Q 11/0066; H04Q 2011/0083; H04Q 2213/13098; H04Q 11/04

See application file for complete search history.

(56) References Cited

FOREIGN PATENT DOCUMENTS

| CN | 104081709 A | 10/2014 |
|---|---|---|
| CN | 104780603 | 7/2015 |
| CN | 105099534 A | 11/2015 |
| CN | 105393470 A | 3/2016 |
| CN | 105511498 A | 4/2016 |

OTHER PUBLICATIONS

CN201611033145.7 2nd Search Report dated Oct. 23, 2019.
CN201611033145.7 1st Search Report dated Mar. 4, 2019.
CN201611033145.7 Notification to Grant Patent Right for Invention dated Nov. 1, 2019.
ZTE Quasi Co-Location of Antenna Ports for FD-MIM0,Oct. 9, 2015, R1-155261, 3GPP TSG RAN WG1 Meeting #82bis.
First Office Action received in application No. CN201611033145.7 dated Mar. 14, 2019.
Second Office Action received in application No. CN201611033145.7 dated Apr. 30, 2019.
Third Office Action received in application No. CN201611033145.7 dated Sep. 5, 2019.

* cited by examiner

METHOD AND DEVICE IN UE, BASE STATION AND SERVICE CENTER

CROSS-REFERENCE TO RELATED APPLICATION

This application is a continuation of U.S. application Ser. No. 16/416,282, filed May 20, 2019, which is a continuation of International Application No. PCT/CN2017/108045, filed Oct. 27, 2017, claiming the priority benefit of Chinese Patent Application Serial Number 201611033145.7, filed on Nov. 20, 2016, the full disclosure of which is incorporated herein by reference.

BACKGROUND

Technical Field

The present disclosure relates to wireless signal transmission in wireless communication systems, and in particular to a method and a device for positioning.

Related Art

In traditional digital modulation-based wireless communication, such as 3GPP (3rd Generation Partner Project) cellular systems, UE often estimates the OTDOA (Observed Time Difference of Arrival) of the downlink signal which came from plurality of base stations through PRS (Positioning Reference Signal), and reports the result to the E-SMLC (Enhanced Serving Mobile Location Centre) to achieve positioning of the user equipment (UE).

In the 5G system, Massive MIMO (Multiple Input Multiple Output) and corresponding BF (Beamforming) technology will be widely used, and the downlink reference signal processed by BF will have significant directivity. The positioning method currently used will have room for improvement.

SUMMARY

In the 5G system, a positioning method for implementing the UE still adopts the OTDOA-based multi-base station positioning technology of the existing system. However, when the base station can only work in the high frequency band, the correspondence transmitted PRS also has certain directivity, that is, the PRS is not able to cover in all directions. In this case, a direct method is for the PRS transmit in the Sweeping manner to all directions, because there is no guarantee that the receiving direction of the UE can be timely and accurately aligned with the transmitting direction of the PRS. The method will result in an increase in positioning calculation delay.

In response to the above problems, the present disclosure provides a solution. It should be noted that, in the absence of conflict, the embodiments of the present disclosure and the features in the embodiments may be arbitrarily combined. For example, features in embodiments and embodiments in the UE of the present disclosure may be applied to a base station, and vice versa.

The present disclosure provides a method for positioning in a UE, comprises:
transmitting first information;
receiving X1 first signals; and
transmitting a first measurement report; wherein the first information is used to determine X1 first antenna ports, and the X1 first antenna ports are respectively used to transmit the X1 first signals; the first measurement report includes K1 piece(s) of measurement information. Each of the K1 piece(s) of measurement information corresponds to one of the X1 first signals; the measurement information is used to determine at least the first two of a set of corresponding time lengths, first antenna port(s) or a first angles correspondingly; the set of time lengths and the first angle are both related to the first antenna port(s); the set of time lengths includes one or more time lengths; the recipient of the first information and the recipient of the first measurement report are non-co-location; the X1 is a positive integer greater than 1, and the K1 is a positive integer.

In one embodiment, the above method is advantageous in that the first information is feedback information when the UE performs beam selection. In a 5G system, the UE needs to access a base station, or a TRP (Transmission Reception Point), or a gNB (New Generation NodeB) to obtain services, and beam selection is required to obtain which beam direction or antenna port (group) the UE is served in the base station. The information of the beam selection is used to indicate the transmission direction of the base station and the positioning server PRS such that the UE performing positioning could be more accurately aligned. For the omnidirectional PRS Sweeping mode, the generation of the PRS transmission direction and the transmission port according to the result of the beam selection reported by the UE may complete the positioning process more quickly and more accurately.

In one embodiment, another advantage of the above method is that the AoA (Angle of Arrival) measurement and reporting is introduced by reporting the information of the first angle, thereby further increasing the accuracy of the positioning.

In one embodiment, each of the first antenna port(s) is formed by superimposing multiple antennas through antenna virtualization, and mapping coefficients of the multiple antennas to the antenna ports constitute a beamforming vector.

In a sub-embodiment of the above embodiment, any two of the X1 first antenna ports may not be assumed to be the same. As a sub-embodiment of the sub-embodiment, the beamforming vectors corresponding to any two of the X1 first antenna ports may not be assumed to be the same. As a sub-embodiment of the sub-embodiment, the UE cannot perform joint channel estimation by using a reference signal transmitted by any two of the X1 first antenna ports. As a sub-embodiment of the foregoing embodiment, the beamforming vectors corresponding to at least two of the first antenna port(s) of the X1 first antenna ports are the same.

In one embodiment, the X1 first antenna ports respectively correspond to X1 different beam identifiers (Beam-IDs).

In one embodiment, the X1 first signals are sent by the way of Beam Sweeping.

In one embodiment, any one of the X1 first signals is associated with at least one of the measurement information.

In one embodiment, the time domain resources occupied by any two of the X1 first signals are orthogonal. The orthogonal means that there is no one time interval belongs to two time domain resources at the same time In one embodiment, the first information includes Y1 target antenna port(s), and an angle covered by the Y1 target antenna port(s) is related to an angle covered by the X1 first antenna ports.

In a sub-embodiment of this embodiment, the angle covered by the Y1 target antenna port(s) is equal to the angle covered by the X1 first antenna ports.

In a sub-embodiment of this embodiment, the angle covered by the X1 first antenna ports includes an angle covered by the Y1 target antenna port(s).

In one embodiment, the first information includes Y1 target antenna port(s), and the direction covered by the Y1 target antenna port(s) is related to the direction covered by the X1 first antenna ports.

In a sub-embodiment of this embodiment, the direction covered by the Y1 target antenna port(s) is equal to the direction covered by the X1 first antenna port s.

In a sub-embodiment of this embodiment, the direction covered by the X1 first antenna ports includes the direction covered by the Y1 target antenna port(s).

In one embodiment, the first information includes Y1 target antenna port(s), and the beamforming vector corresponding to the Y1 target antenna port(s) is related to the beamforming vector corresponding to the X1 first antenna ports.

In a sub-embodiment of the foregoing embodiment, the beamforming vector corresponding to the Y1 target antenna port(s) is used to determine the beamforming vector corresponding to the X1 first antenna ports.

In a sub-embodiment of the foregoing two embodiments, the CSI-RS (Channel Status Information Reference Signal) is transmitted on the Y1 target antenna port(s).

In an embodiment, the measurement information includes an index of the first antenna port(s) and a set of the time length.

In an embodiment, the measurement information is used to determine time domain resource(s) occupied by the corresponding first signal.

In an embodiment, the measurement information includes a first type of channel quality, and the first signal corresponding to the measurement information is used to determine the first type of channel quality.

In a sub-embodiment of the embodiment, the first type of channel quality includes at least one of RSRP (Reference Signal Received Power), RSRQ (Received Signal Strength Indicator), RSSI (Received Signal Strength Indicator, and SNR (Signal to Noise Rate).

In a sub-embodiment of this embodiment, the unit of the first type of channel quality is one of dBm (millimeters), dB (decibel), milliwatts and joules.

In an embodiment, the first signal includes an RS (Reference Signal) port, and the RS port is transmitted by one of the first antenna port(s).

In a sub-embodiment of the foregoing embodiment, the RS port is a CSI-RS port.

In a sub-embodiment of the foregoing embodiment, the RS port is a DMRS (Demodulation Reference Signal) port.

In a sub-embodiment of the foregoing embodiment, the RS port is a PRS port.

In one embodiment, the set of the time lengths indicated by at least two of the K1 pieces of measurement information includes a different number of the time lengths.

In one embodiment, the set of time lengths includes at least two different the time lengths.

In one embodiment, the unit of time length is microseconds.

In one embodiment, the set of time lengths includes just one the time lengths.

In one embodiment, the first signal transmitted by the first antenna port(s) is used to determine associated the set of time lengths.

In one embodiment, each of the X1 first signals are generated by a sequence.

In a sub-embodiment of the above embodiment, the sequence comprises a pseudo-random sequence.

In a sub-embodiment of the above embodiment, the sequence comprises a Zadoff-Chu sequence.

In one embodiment, the recipient of the first measurement report is SMLC (Serving Mobile Location Centre).

In one embodiment, the recipient of the first measurement report is E-SMLC.

In one embodiment, the recipient of the first measurement report is SLP (SUPL Location Platform), wherein SUPL is Secure User Plane Location.

In one embodiment, the recipient of the first measurement report is LMU (Location Measurement Unit).

In one embodiment, the recipient of the first measurement report belongs to core network.

In one embodiment, the first angle is an angle between a receiving direction of a receiving antenna port paired with the first antenna port(s) and a vertical direction of an antenna array of a given node. The recipient of the X1 first signals includes the given node.

In one embodiment, the first angle is the first signal AoA transmitted by the corresponding first antenna port(s).

In one embodiment, the recipient of the first information is first node, and the recipient of the first measurement report is second node.

In a sub-embodiment of the above embodiment, the first node and the second node are non-co-location means that the first node and the second node are two different communication devices.

In one embodiment, the first node is one of a base station, a TRP and a gNB.

According to one aspect of the present disclosure, the above method comprises:

receiving X2 second signals;

wherein the X2 second signals is respectively transmitted by X2 second antenna ports, and the first information is used to determine the X2 second antenna ports; each of the K1 piece(s) of measurement information is for a second signal of the X2 second signals; the measurement information is used to determine a second antenna port(s); the second antenna port(s) is(are) used to transmit the second signal corresponding to the measurement information. The set of time lengths and the second antenna port are associated; the X2 is a positive integer. In one embodiment, the advantage of the above method is that reporting the received time difference between a given first signal and a given second signal by simultaneously measuring the second signals from different base stations or different TRPs or different gNBs in order to obtain the positioning information.

In one embodiment, each of the second antenna ports is formed by superimposing a plurality of antennas through antenna virtualization, and mapping coefficients of the plurality of antennas to the antenna ports constitute beamforming vector.

In a sub-embodiment of the above embodiment, any two of the X2 second antenna ports may not be assumed to be the same.

In a sub-embodiment of the above embodiment, the beamforming vectors corresponding to at least two of the X2 second antenna ports are the same. In one embodiment, the X2 second antenna ports respectively correspond to X2 different Beam-ID(s).

In one embodiment, the X2 second signals is transmitted by the way of Beam Sweeping.

In one embodiment, the time domain resource(s) occupied by the X2 second signals is orthogonal.

In one embodiment, the measurement information includes an index of the second antenna port(s).

In one embodiment, the measurement information is used to determine time domain resource(s) occupied by the corresponding second signal.

In one embodiment, the measurement information includes second type of channel quality, and the second signal corresponding to the measurement information is used to determine the second type of channel quality.

In a sub-embodiment of this embodiment, the second type of channel quality includes at least one of RSRP, RSRQ, RSSI and SNR.

In a sub-embodiment of this embodiment, the unit of the second type of channel quality is one of dBm, dB, milliwatts and joules.

In one embodiment, the second signal includes an RS port, and the RS port is transmitted by the second antenna ports.

In a sub-embodiment of this embodiment, the RS port is a CSI-RS port.

In a sub-embodiment of this embodiment, the RS port is DMRS port.

In a sub-embodiment of this embodiment, the RS port is a PRS port.

In one embodiment, each of the X2 second signals is generated by a sequence.

In one embodiment, the K1 is equal to the product of the X1 and the X2, and at least one of the first signal and the second signal corresponding to any two of the K1 pieces of measurement information is different. Any one of the X 2 second signals is associated with at least one of the measurement information.

In one embodiment, the K1 piece(s) of measurement information is(are) determined by the Z1 first signal(s) and the Z2 second signal(s). The Z1 first signal(s) is(are) a subset of the X1 first signals. The Z2 second signal(s) is(are) a subset of the X2 first signal(s).

In a sub-embodiment of the embodiment, the received signal strengths of the Z1 first signal(s) is all greater than first threshold. The first threshold is fixed or used by higher layer signaling. The strength of the received signal corresponds to one of RSRP, RSRQ, RSSI, SNR and SINR.

In a sub-embodiment of the embodiment, the received signal strengths of the Z2 second signal(s) is(are) all greater than a second threshold. The second threshold is fixed or used by higher layer signaling. The strength of the received signal corresponds to one of RSRP, RSRQ, RSSI, SNR and SINR.

In one embodiment, the set of given time lengths comprises M time length(s), the set of given time lengths is for one of the K1 piece(s) of measurement information. The set of given time lengths is associated with a given first signal of the X1 first signals, and the set of the given time lengths is associated with a given second signal of the X2 second signals. The time lengths corresponds to a difference between a time when the given first signal passes through one of the M1 paths to the UE and a time when the given second signal passes through one of the M2 paths to the UE. The M time length(s) is(are) in one-to-one correspondence with the M1*M2 combinations obtained by the pairwise pairing between the M1 path(s) and the M2 path(s). The M, the M1 and the M2 are all positive integers, and the M is equal to the product of the M1 and the M2. Any two of the M1 paths are different, and any two of the M2 paths are different.

According to one aspect of the present disclosure, the above method comprises:

receiving a first signaling;

wherein the first signaling is used to determine at least one of X1 pieces of first configuration information and X2 pieces of second configuration information; the X1 pieces of first configuration information respectively correspond to the X1 first antenna ports. The X2 pieces of second configuration information correspond to the X2 second antenna ports respectively; the first configuration information includes at least one of corresponding time frequency domain resource occupied by the first antenna port(s), transmitting antenna port, associated ID, and CP (Cyclic Prefix) length corresponding to the transmitted signal; the second configuration information includes at least one of corresponding time frequency domain resource occupied by the second antenna port, transmitting antenna port(s), association ID or a CP length.

In one embodiment, the foregoing method, the positioning server transmits the configuration information of the X1 first antenna ports and the configuration information of the X2 second antenna ports to the UE, and based on the first antenna port(s) and the second port further performs positioning measurements.

In one embodiment, the first signaling is high layer signaling.

In one embodiment, the source transmitter of the first signaling belongs to core network.

In one embodiment, the first signaling starts from a core network.

In one embodiment, the first signaling explicitly indicates at least one of X1 pieces of first configuration information and X2 pieces of second configuration information.

In one embodiment, the first signaling implicitly indicates at least one of X1 pieces of first configuration information and X2 pieces of second configuration information.

In one embodiment, the first signaling comprises PRS-Info in TS 36.355.

In one embodiment, the first signaling includes OTDOA-Provide Assistance Data in TS 36.355.

In one embodiment, the first signaling includes auxiliary information for transmitter of the X1 first signals and auxiliary information for transmitter of the X2 second signals.

In a sub-embodiment of the embodiment, the auxiliary information includes feature identifier of transmitter of given signal, geographical location coordinate, timing information, carrier frequency occupied, maximum continuous time interval that can be occupied, and CP length. The given signal is one of the first signal and the second signal. In an exemplary embodiment of the sub-embodiment, the feature identifier is PCID (Physical Cell Identity).

In an exemplary embodiment of the sub-embodiment, the feature identifier is CGI (Cell Global Identity).

In an exemplary embodiment of the sub-embodiment, the feature identifier is ECGI (Evolved Cell Global Identity).

In an exemplary embodiment of the sub-embodiment, the geographic location coordinates include three coordinate axes of horizontal, vertical and height.

In an exemplary embodiment of this sub-embodiment, the geographic location coordinates are represented by Azimuth angle.

In an exemplary embodiment of the sub-embodiment, the timing information refers to timing information of radio frame.

In an exemplary embodiment of this sub-embodiment, the timing information refers to timing information of subframe.

In an exemplary embodiment of this sub-embodiment, the timing information refers to timing information of OFDM symbol.

In an exemplary embodiment of this sub-embodiment, the timing information refers to timing information of slot.

In an exemplary embodiment of this sub-embodiment, the timing information refers to timing information of mini-slot.

In an exemplary embodiment of this sub-embodiment, the carrier frequency is represented by Band index.

In an exemplary embodiment of this sub-embodiment, the carrier frequency is represented by ARFCN (Absolute Radio Frequency Channel Number).

In an exemplary embodiment of this sub-embodiment, the carrier frequency is represented by EARFCN (E-UTRA Absolute Radio Frequency Channel Number).

In an exemplary embodiment of this sub-embodiment, the maximum continuous time interval is represented by the number of subframes.

In an exemplary embodiment of this sub-embodiment, the maximum continuous time interval is represented by the number of time slots.

In an exemplary embodiment of this sub-embodiment, the maximum continuous time interval is represented by the number of OFDM symbols.

In one embodiment, the associated ID is related to at least one of Beam-ID of the given antenna port and ID of a node configuring the given antenna port. The given antenna port is one of the first antenna port(s) and the second antenna port.

According to one aspect of the present disclosure, the above method is characterized by comprises:

receiving second signaling; and receiving X3 third signals;

wherein the second signaling is used to determine X3 pieces of third configuration information; the X3 third signals are respectively transmitted in X3 third antenna ports; the X3 pieces of third configuration information correspond to the X3 third antenna ports respectively; the third configuration information includes at least one of time-frequency domain resource occupied by the corresponding third antenna port, transmitting antenna port(s), associated ID, or a CP length corresponding to the transmitted signal correspondingly; The X3 is a positive integer greater than 1.

In one embodiment of the foregoing method, the second signaling corresponds to CSI-RS for beam selection used by a serving base station of the UE or a TRP or a gNB.

In one embodiment, each of the third antenna ports is formed by superimposing multiple antennas through antenna virtualization, and the mapping coefficients of the multiple antennas to the antenna ports constitute beamforming vector.

In a sub-embodiment of the above embodiment, any two of the X3 third antenna ports may not be assumed to be the same.

In a sub-embodiment of the above embodiment, the beamforming vectors corresponding to at least two of the X3 third antenna ports are the same.

In one embodiment, the X3 third antenna ports respectively correspond to X3 different Beam-ID(s).

In one embodiment, the X3 third signals are transmitted by the way of Beam Sweeping.

In one embodiment, the time domain resources occupied by the X3 third signals are) orthogonal.

In one embodiment, the X3 third antenna ports correspond to CSI-RS port(s).

In one embodiment, the first information includes Y1 target antenna port(s), the Y1 target antenna port(s) is(are) a subset of the X3 third antenna ports, and the Y1 is not greater than the X3.

In one embodiment, the associated ID is related to at least one of Beam-ID of the third antenna port and ID of a node configuring the third antenna port.

According to one aspect of the present disclosure, the above method comprises;

transmitting second measurement report;

wherein the second measurement report includes at least one of X1 pieces of matching information and X2 pieces of matching information; the X1 pieces of matching information respectively correspond to X1 fourth antenna ports, the X2 pieces of matching information respectively correspond to X2 fifth antenna ports; the X1 fourth antenna ports are respectively used for receiving the X1 first signals, and the X2 fifth antenna ports are respectively used for receiving the X2 second signals; the matching information includes identifier of the corresponding antenna port, at least one of time domain resource allocated to the corresponding antenna port and direction angle of the corresponding antenna port.

In one embodiment, by reporting the second measurement report, the positioning service center obtains the received beam information (for example, the direction angle) of the positioning reference signal at the receiving end, thereby further improving the positioning accuracy.

In one embodiment, the second measurement report is transmitted through higher layer.

In one embodiment, the second measurement report is transmitted through a user plane.

In one embodiment, the second measurement report is transmitted through a control plane.

In one embodiment, the destination recipient of the second measurement report belongs to the core network.

In a sub-embodiment of this embodiment, the destination recipient of the second measurement report is one of SMLC, E-SMLC and SLP.

In one embodiment, each of the fourth antenna ports is formed by superimposing a plurality of antennas through antenna virtualization, and mapping coefficients of the plurality of antennas to the antenna ports constitute beamforming vector.

In a sub-embodiment of the above embodiment, any two of the X1 fourth antenna ports may not be assumed to be the same.

In a sub-embodiment of the above embodiment, the beamforming vectors corresponding to at least two of the X1 fourth antenna ports are the same.

In one embodiment, each of the fifth antenna ports is formed by superimposing a plurality of antennas through antenna virtualization, and mapping coefficients of the plurality of antennas to the antenna ports constitute beamforming vector.

In a sub-embodiment of the foregoing embodiment, any two of the X2 fifth antenna ports may not be assumed to be the same.

In a sub-embodiment of the foregoing embodiment, the beamforming vectors corresponding to at least two of the X2 fifth antenna ports are the same.

In one embodiment, the direction angle includes an angle and a direction covered by the receiving antenna port.

In one embodiment, the direction angle is a sector geographic area covered by the receiving antenna port. In one embodiment, the direction angles corresponding to any two of the X1 fourth antenna ports are orthogonal, and the orthogonal refers to a sector geographic area in which there is no area belongs to corresponded two direction angles at the same time.

In one embodiment, the direction angles corresponding to existing two of the X1 fourth antenna ports are non-orthogonal.

In one embodiment, the direction angles corresponding to any two of the X2 fifth antenna ports are orthogonal.

In one embodiment, the direction angles corresponding to existing two of the X2 fifth antenna ports are non-orthogonal.

In one embodiment, the X1 fourth antenna ports belong to receiving antenna ports of the UE.

In one embodiment, the X2 fifth antenna ports belong to receiving antenna ports of the UE.

In one embodiment, the fourth antenna port identifier corresponds to antenna port number of the fourth antenna port(s).

In one embodiment, the fifth antenna port identifier corresponds to antenna port number of the fifth antenna ports.

In one embodiment, the fourth antenna port identifier corresponds to an index of the fourth antenna port(s) in all receiving antenna ports used by the UE.

In one embodiment, the fifth antenna port identifier corresponds to an index of the fifth antenna ports in all receiving antenna ports used by the UE.

In one embodiment, the time domain resource occupied by given antenna port means that the UE is used with K2 receiving antenna port(s), and the K2 receiving antenna port(s) receives signals in K2 time windows, the given antenna port receiving signals on the K3th time window of the K2 time windows; the matching information including an index of the K3 in the K2. The K3 is a positive integer greater than 0 and not less than K2. The given antenna port is one of the fourth antenna port(s) and the fifth antenna port(s).

In one embodiment, the direction angle of a given antenna port refers to the degree of the angle between the direction of the received signal of the given antenna port and the vertical direction of the antenna array used by the UE. The given antenna port is one of the fourth antenna ports and the fifth antenna ports.

In one embodiment, the direction angle of a given antenna port means that the UE is used with K2 receiving antenna port(s), and the K2 receiving antenna port(s) receive signals on the K2 directions, the given antenna port receiving signals on the K4th direction of the K2 time windows, the matching information including an index of the K4 in the K2. The K4 is a positive integer greater than 0 and not less than K2. The given antenna port is one of the fourth antenna ports and the fifth antenna ports.

According to one aspect of the present disclosure, the above method is characterized in that the first signal is associated with a first ID, the first ID is a positive integer; or the second signal is associated with a second ID, the second ID is positive Integer.

In one embodiment, the first ID and the second ID are different.

In one embodiment, the first ID and the second ID are equal.

In one embodiment, a given signal associated with a given ID means that the given ID is used to generate an RS sequence of the signal. The given signal is the first signal, and the given ID is the first ID; or the given signal is the second signal, and the given ID is the second ID.

In one embodiment, the given ID is one of PCID, CGI and ECGI. The given ID is one of the first ID and the second ID.

In one embodiment, the given ID is the ID of the corresponding TRP. The given ID is one of the first ID and the second ID.

In one embodiment, the given ID is the ID of the corresponding gNB. The given ID is one of the first ID and the second ID.

In one embodiment, the given ID corresponds to the ID of the RRH (Remote Radio Head). The given ID is one of the first ID and the second ID.

In one embodiment, the given ID is Cell Specific. The given ID is one of the first ID and the second ID.

In one embodiment, the given ID is TRP specific. The given ID is one of the first ID and the second ID.

In one embodiment, the given ID is gNB specific. The given ID is one of the first ID and the second ID.

According to one aspect of the present disclosure, the above method is characterized in that the time length(s) is used to determine a difference between reception time(s) of the associated first signal and reception time(s) of the associated second signal.

In one embodiment, the receiving time is a receiving start time.

In one embodiment, the receiving time is an ending time of receiving.

In one embodiment, each of the X1 first signals is generated by a sequence having a correlation, and each of the X2 second signals is generated by a sequence having a correlation, The receiving time of the first signal is the time corresponding to a correlation peak of the corresponding first signal after the correlation operation, and the receiving time of the second signal is a time corresponding to the correlation peak of the corresponding second signal after the correlation operation.

The present disclosure provides a method for positioning in a base station used, comprises:

receiving first information; and transmitting X1 first signals;

wherein the first information is used to determine X1 first antenna ports, and the X1 first antenna ports is respectively used to transmit the X1 first signals; the X1 first antenna ports correspond to the X1 pieces of first configuration information respectively; the first configuration information includes at least one of time frequency domain resource occupied by the corresponding first antenna port(s), transmitting antenna port(s), associated ID, or a CP length corresponding to the transmitted signal correspondingly. The X1 is a positive integer greater than 1.

In one embodiment, the first information is transmitted through an air interface.

In one embodiment, the transmitter of the first information is a terminal device. According to one aspect of the present disclosure, the above method comprises:

Step B1. Transmitting X2 second signals;

wherein the first information is used to determine X2 second antenna ports, and the X2 second antenna ports is respectively used to transmit the X2 second signals;

the X2 second antenna ports correspond to the X2 pieces of second configuration information; the second configuration information includes at least one of time-frequency domain resource occupied by the corresponding second antenna port, transmitting antenna port(s), associated ID, or a CP length corresponding to the transmitted signal correspondingly. The X2 is a positive integer greater than 1.

According to one aspect of the present disclosure, the above method comprises:

transmitting second information;

wherein, the second information is used to determine at least the former of the X1 pieces of first configuration information and the X2 pieces of second configuration information.

In one embodiment, the second information is transmitted by the core network.

In one embodiment, the second information is transmitted by the S1 interface.

According to one aspect of the present disclosure, the above method comprises:

transmitting second signaling; and transmitting X3 third signals;

wherein the second signaling is used to determine X3 pieces of third configuration information; the X3 third signals are transmitted in X3 third antenna ports; the X3 pieces of third configuration information correspond to the X3 third antenna ports respectively; the third configuration information includes at least one of time frequency domain resource occupied by the corresponding third antenna port, transmitting antenna port(s), associated ID, or a CP length corresponding to the transmitted signal correspondingly; X3 is a positive integer greater than 1.

According to one aspect of the present disclosure, the above method comprises:

the first signal is associated with first ID, the first ID is a positive integer; or the second signal is associated with second ID, the second ID is positive Integer.

transmitting third information;

wherein the third information includes the first ID, association information of the first ID, the second ID and association information of the second ID, the association information includes at least one of a corresponding geographic location coordinates, a corresponding to timing information, a corresponding carrier frequency, a maximum continuous time interval that can be allocated and a corresponding CP length.

In one embodiment, the advantages of the foregoing method are that the base station reports the association information of the local base station and adjacent base stations included in the positioning algorithm to the positioning server, thereby improving the accuracy of the positioning algorithm.

In one embodiment, the third information is transmitted by the core network.

In one embodiment, the third information is transmitted by the S1 interface.

In one embodiment, the geographic location coordinates include three coordinate axes of horizontal, vertical, and high.

In one embodiment, the geographic location coordinates are represented by Azimuth angle.

In one embodiment, the timing information refers to timing information of radio frame.

In one embodiment, the timing information refers to timing information of subframe.

In one embodiment, the timing information refers to timing information of OFDM symbol.

In one embodiment, the timing information refers to timing information of slot.

In one embodiment, the timing information refers to timing information of mini-slot.

In one embodiment, the carrier frequency is represented by Band index.

In one embodiment, the carrier frequency is represented by ARFCN.

In one embodiment, the carrier frequency is represented by EARFCN.

In one embodiment, the maximum continuous time interval is represented by the number of subframes.

In one embodiment, the maximum continuous time interval is represented by the number of time slots.

In one embodiment, the maximum continuous time interval is represented by the number of OFDM symbols.

According to one aspect of the present disclosure, the above method is characterized in that the second information comprises the first information; or the third information comprises the first information.

In one embodiment, the above method is characterized in that the base station reports the first information to the positioning server to improve the accuracy of the positioning algorithm.

The present disclosure provides a method for positioning in a service center used, comprises:

receiving second information; and receiving first measurement report;

wherein the second information is used to determine at least one of the X1 pieces of first configuration information and the X2 pieces of second configuration information; the X1 pieces of first configuration information correspond to the X1 first antenna ports respectively. The X2 pieces of second configuration information correspond to the X2 second antenna ports respectively; the X1 first antenna ports are respectively used for transmitting X1 first signals, and the X2 second antenna ports are respectively used for transmitting X2 second signals; the first configuration information includes at least one of time frequency domain resource occupied by the corresponding first antenna ports, transmitting antenna port, associated ID, or a CP length corresponding to the transmitted signal correspondingly; The second configuration information includes at least one of time frequency domain resource occupied by the corresponding second antenna port, transmitted antenna port(s), associated ID, or a CP length corresponding to the transmitted signal correspondingly; the first measurement report include K1 piece(s) of measurement information, each of the K1 piece(s) of measurement information corresponds to one the X1 first signals; the measurement information is used to determine a set of corresponding time lengths, first antenna port(s) and a first angle(s) correspondingly; the set of time lengths and the first angle are both related to the first antenna port(s); the set of time lengths includes one or more time lengths; The transmitter of the second information and the transmitter of the first measurement report are non-co-located; the X1 and the X2 are both positive integers; and the K1 is a positive integer.

In one embodiment, the transmitter of the second information is one of base station, TRP and gNB.

In one embodiment, the transmitter of the first measurement report is UE.

According to one aspect of the present disclosure, the above method comprises:

transmitting first signaling;

wherein, the first signaling is used to determine at least one of the X1 pieces of first configuration information and the X2 pieces of second configuration information.

According to one aspect of the present disclosure, the above method comprises:

receiving second measurement report;

wherein the second measurement report includes at least one of X1 pieces of matching information and X2 pieces of matching information; the X1 pieces of matching information correspond to X1 fourth antenna ports respectively, and the X2 pieces of matching information correspond to X2 fifth antenna ports respectively, the X1 fourth antenna ports are respectively used to receive the X1 first signals, and the X2 fifth antenna ports are respectively used to receive the X2 second signals; The matching information includes at least one of identifier of the corresponding antenna port, time domain resource allocated to the corresponding antenna port and direction angle of the corresponding antenna port.

According to one aspect of the present disclosure, the above method is characterized in that each of the K1 piece(s) of measurement information is corresponds to one the X2 second signals; the measurement information is used to determine one second antenna port; the second antenna port(s) is(are) used to transmit the second signal corresponding to the measurement information; the set of time lengths and the second antenna port are associated.

According to one aspect of the present disclosure, the above method is characterized in that the first signal is associated with first ID, the first ID is positive integer; or the second signal is associated with second ID, the second ID is positive Integer.

According to one aspect of the present disclosure, the above method is characterized in that the time length is used to determine a difference between a receiving time of the associated first signal and a receiving time of the associated second signal.

According to one aspect of the present disclosure, the above method comprises:

receiving third information;

wherein the third information includes the first ID, association information of the first ID, the second ID and association information of the second ID, and the association information includes one of a corresponding geographic location coordinates, corresponding timing information, corresponding carrier frequency, maximum continuous time interval that can be allocated and corresponding CP length.

According to one aspect of the present disclosure, the second information comprises first information; or the third information comprises first information; the first information is used to determine at least the first two of the X1 first antenna ports and the X2 second antenna ports; the transmitter of the first information and the transmitter of the first measurement report are co-location.

In one embodiment, the transmitter of the first information is UE.

The present disclosure provides a UE used for positioning, which comprises:

a first transceiver transmits first information;

a first receiver receives X1 first signals; and a second transceiver, transmits first measurement report;

wherein the first information is used to determine X1 first antenna ports, and the X1 first antenna ports are respectively used to send the X1 first signals; the first measurement report includes K1 piece(s) of measurement information. Each of the K1 piece(s) of measurement information is for one of the X1 first signals; the K1 first signal(s) belongs to the X1 first signals; the measurement Information is used to determine at least the first two of a set of corresponding time lengths, the first antenna port(s) and the first angle(s) correspondingly; the set of time lengths and the first angle are both related to the first antenna port(s); the set of time lengths includes one or more time lengths; the recipient of the first information and the recipient of the first measurement report are non-co-location; the X1 is positive integer greater than 1, the K1 is positive integer.

In one embodiment, the above UE used for positioning is characterized in that the first transceiver further receives second signaling and is used for receiving X3 third signals; the second signaling is used to determine the X3 pieces of third configuration information; the X3 third signals are transmitted at the X3 third antenna ports; the X3 pieces of third configuration information correspond to the X3 third antenna ports respectively; the third configuration information includes at least one of a time frequency domain resource occupied by the corresponding second antenna port(s), a transmitted antenna port(s), an associated ID, or a CP length corresponding to the transmitted signal correspondingly. The X3 is positive integer greater than 1.

In one embodiment, the foregoing UE used for positioning is characterized in that the first receiver further receives X2 second signals; the X2 second signals is respectively sent by X2 second antenna ports, The first information is used to determine the X2 second antenna ports; each of the K1 piece(s) of measurement information is for one of the X2 second signals; the measurement information is used determining a second antenna port(s); the second antenna port(s) is(are) used to send the second signal corresponding to the measurement information; the set of time lengths and the second antenna port are associated. The X 2 is positive integer.

In one embodiment, the foregoing UE used for positioning is characterized in that the second transceiver further receives first signaling; the first signaling is used to determine at least one of the X1 pieces of first configuration information and the X2 pieces of second configuration information; the X1 pieces of first configuration information respectively correspond to the X1 first antenna ports, and the X2 pieces of second configuration information respectively correspond to the X2 second antenna ports; The first configuration information includes at least one of a time frequency domain resource occupied by the corresponding first antenna ports, a transmitted antenna ports, an associated ID, or a CP length corresponding to the transmitted signal correspondingly; the second configuration information includes at least one of a time frequency domain resource occupied by the corresponding second antenna port, a transmitted antenna ports, an associated ID, or a CP length corresponding to the transmitted signal.

In one embodiment, the foregoing UE used for positioning is characterized in that the second transceiver further sends second measurement report; the second measurement report includes at least one of X1 pieces of matching information and X2 pieces of matching information. The X1 pieces of matching information respectively correspond to the X1 fourth antenna ports, and the X2 pieces of matching information respectively correspond to the X2 fifth antenna ports; the X1 fourth antenna ports are respectively used for the receiving the X1 first signals, the X2 fifth antenna ports are respectively used to receive the X2 second signals; the matching information includes at least one of an identifier of the corresponding antenna port, time domain resource allocated to the corresponding antenna port and direction angle of the corresponding antenna port.

In one embodiment, the foregoing UE used for positioning is characterized in that the first signal is associated with first ID, the first ID is positive integer; or the second signal is associated with second ID, the second ID is positive integer.

In one embodiment of the above mentioned UE used for positioning, the time lengths is used to determine a difference between a receiving time of the associated first signal and a receiving time of the associated second signal.

The present disclosure provides a base station used for positioning, which comprises:
- a third transceiver receives the first information;
- a first transmitter transmits X1 first signals; and
- a second transmitter transmits second information;

wherein the first information is used to determine X1 first antenna ports, and the X1 first antenna ports are respectively used for transmitting the X1 first signals; the X1 first antenna ports correspond to the X1 pieces of first configuration information respectively; the first configuration information includes at least one of a time frequency domain resource occupied by the corresponding first antenna port(s), a transmitting antenna port, an associated ID, or a CP length corresponding to the transmitted signal correspondingly. The second information is used to determine at least the former of the X1 pieces of first configuration information and the X2 pieces of second configuration information.

In one embodiment of the base station used for positioning, the third transceiver further sends second signaling and is used for transmitting X3 third signals; the second signaling is used to determine the X3 pieces of third configuration information; the X3 third signals are transmitted by the X3 third antenna ports; the X3 pieces of third configuration information correspond to the X3 third antenna ports respectively; and the third configuration information includes at least one of a time frequency domain resource occupied by the corresponding third antenna ports, a transmitting antenna port(s), an associated ID, or a CP length corresponding to the transmitted signal correspondingly. The X3 is a positive integer greater than 1.

In one embodiment of the base station used for positioning, the first transmitter further transmits X2 second signals; the first information is used to determine X2 second antenna ports, the X2 second antenna ports are respectively used for transmitting the X2 second signals; the X2 second antenna ports correspond to the X2 second configuration information respectively; the second configuration information includes at least one of a time frequency domain resource occupied by the corresponding second antenna port, transmitting antenna port(s), an associated ID, or a CP length corresponding to the transmitted signal correspondingly. The X2 is a positive integer greater than 1.

In one embodiment of the base station used for positioning, the second transmitter further sends third information; the third information includes the first ID, associated information of the first ID, the second ID and association information of the second ID. The association information includes one of the corresponding geographic location coordinates, corresponding timing information, corresponding carrier frequency, maximum continuous time interval that can be allocated and corresponding CP length.

In one embodiment of the base station used for positioning, the first signal is associated with first ID, the first ID is a positive integer; or the second signal is associated with second ID, the second ID is a positive integer.

In one embodiment of the base station used for positioning, the second information includes the first information; or the third information includes the first information.

The present disclosure provides a service center used for positioning, comprises:
- a second receiver, receives second information; and
- a fourth transceiver, receives first measurement report;

wherein the second information is used to determine at least one of the X1 pieces of first configuration information and the X2 pieces of second configuration information; the X1 pieces of first configuration information respectively correspond to the X1 first antenna ports. The X2 pieces of second configuration information respectively correspond to the X2 second antenna ports. The X1 first antenna ports is(are) respectively used for transmitting X1 first signals, and the X2 second antenna ports are respectively used for sending X2 second signals; the first configuration information includes at least one of a time frequency domain resource occupied by the corresponding first antenna ports, a transmitting antenna port, an associated ID, or a CP length corresponding to the transmitted signal correspondingly. The second configuration information includes at least one of a time frequency domain resource occupied by the corresponding second antenna port, transmit antenna port(s), an associated ID, or a CP length corresponding to the transmitted signal correspondingly; the first measurement report includes K1 piece(s) of measurement information, each of the K1 piece(s) of measurement information is for one of the X1 first signals; the measurement information is used to determine at least the first two of a set of corresponding time lengths, antenna port and first angle correspondingly; the set of time lengths and the first angle are both related to the first antenna ports; the set of time lengths includes one or more time lengths; the transmitter of the second information and the transmitter of the first measurement report are non-co-location; the X1 and the X2 are both positive integers; and the K1 is a positive integer.

In one embodiment of the service center used for positioning, the second receiver further receives third information; the third information includes the first ID, association information of the first ID, the second ID and association information of the second ID. The association information includes one of the corresponding geographic location coordinates, corresponding timing information, corresponding carrier frequency, maximum continuous time interval that can be allocated and corresponding CP length.

In one embodiment of the service center used for positioning, the fourth transceiver further sends the first signaling; the first signaling is used to determine at least one of the X1 pieces of first configuration information and the X2 pieces of second configuration information.

In one embodiment of the foregoing service center used for positioning, the fourth transceiver further receives second measurement report; the second measurement report includes at least one of X1 pieces of matching information and X2 pieces of matching information. The X1 pieces of matching information correspond to the X1 fourth antenna ports respectively, and the X2 matching information correspond to the X2 fifth antenna ports respectively; the X1 fourth antenna ports are respectively used for receiving the X1 first signals, and the X2 fifth antenna ports are respectively used for receiving the X2 second signals. The matching information includes at least one of identifier of the corresponding antenna port, time domain resource allocated to the corresponding antenna port and direction angle of the corresponding antenna port.

In one embodiment of the foregoing service center used for positioning, the first signal is associated with first ID, the first ID is a positive integer; or the second signal is associated with second ID, the second ID is a positive integer.

In one embodiment of the service center used for positioning, the time length is used to determine a difference between a reception time of the associated first signal and a reception time of the associated second signal.

In one embodiment of the service center used for positioning, the second information includes first information; or the third information includes first information. The first information is used to determine at least a former one of the X1 first antenna ports and the X2 second antenna ports; a transmitter of the first information and a transmitter of the first measurement report are co-location.

Compared with the prior art, the present disclosure has the following technical advantages.

By designing the first information and the first measurement report, and determining the X1 first antenna ports by using the first information, thereby determining the X1 first signals, when generating and transmitting a reference signal for positioning, considering the beam selection information of the UE optimizes the transmission direction of the transmission positioning reference signal, thereby improving the positioning accuracy.

By reporting the first angle information, the AoA report is introduced, thereby improving the accuracy of the positioning.

By designing the second measurement report, the matching information of the corresponding receiving antenna port is reported, which helps the service center to more accurately correct the accuracy of the first measurement report, thereby improving the positioning accuracy.

BRIEF DESCRIPTION OF THE DRAWINGS

Other features, objects, and advantages of the present disclosure will become more apparent from the detailed description of the accompanying drawings.

DESCRIPTION OF THE EMBODIMENTS

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment 1

Figure 1:
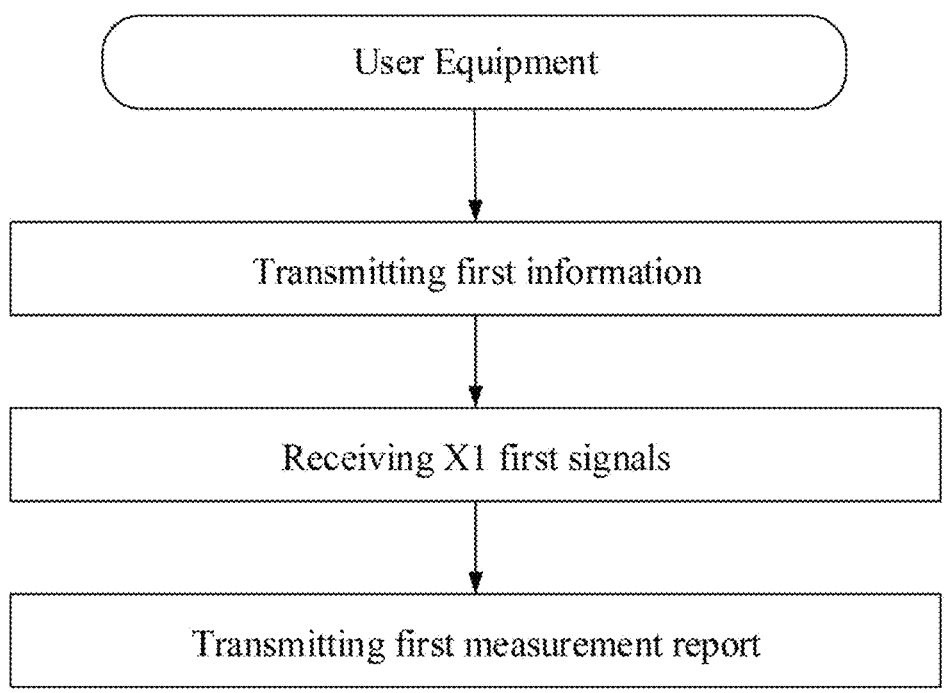
FIG. 1 shows a flowchart of first information in accordance with one embodiment of the present disclosure.

Embodiment 1 shows a flowchart of a first information according to the present disclosure, as shown in FIG. 1.

In Embodiment 1, the user equipment (UE) first transmits first information, and secondly receives X1 first signals, and then transmits first measurement report; the first information is used to determine X1 first antenna ports. The X1 first antenna ports is(are) respectively used to send the X1 first signals; the first measurement report includes K1 piece(s) of measurement information, and each of the K1 piece(s) of measurement information is for one of the X1 first signals; the measurement information is used to determine at least the first two of a set of corresponding time lengths, the first antenna port(s) and the first angle(s) correspondingly; and the set of time lengths and the first angles are related to the first antenna port(s); the set of time lengths includes one or more time lengths; the receiver of the first information and the receiver of the first measurement report are non-co-location; The X1 is a positive integer greater than 1, and the K1 is a positive integer.

In one embodiment, another advantage of the above method is that the AoA (Angle of Arrival) measurement and reporting are introduced by reporting the information of the first angle, thereby further increasing the accuracy of the positioning.

In one embodiment, each of the first antenna port(s) is formed by superimposing multiple antennas through antenna virtualization, and the mapping coefficients of the multiple antennas to the antenna ports constitute a beamforming vector.

In a sub-embodiment of the above embodiment, any two of the X1 first antenna ports may not be assumed to be the same. In a sub-embodiment of the sub-embodiment, the beamforming vectors corresponding to any two of the X1 first antenna ports may not be assumed to be the same. In a sub-embodiment of the sub-embodiment, the UE cannot perform joint channel estimation by using a reference signal transmitted by any two of the X1 first antenna ports. In a sub-embodiment of the above embodiment, the beamforming vectors corresponding to at least two of the first antenna port(s) in the X1 first antenna ports are the same.

In a sub-embodiment, the X1 first antenna ports respectively correspond to X1 different Beam-IDs.

In a sub-embodiment, the X1 first signals are transmitted by the way of Beam Sweeping.

In a sub-embodiment, any one of the X1 first signals are associated with at least one of the measurement information.

In a sub-embodiment, the time domain resource(s) occupied by any two of the X1 first signals are orthogonal. The orthogonal means that there is no time interval being belonged to two time domain resources at the same time.

In a sub-embodiment, the measurement information includes an index of the first antenna port(s) and a set of the time lengths.

In a sub-embodiment, the measurement information is used to determine a time domain resource occupied by the corresponding first signal.

Embodiment 2

Figure 2:
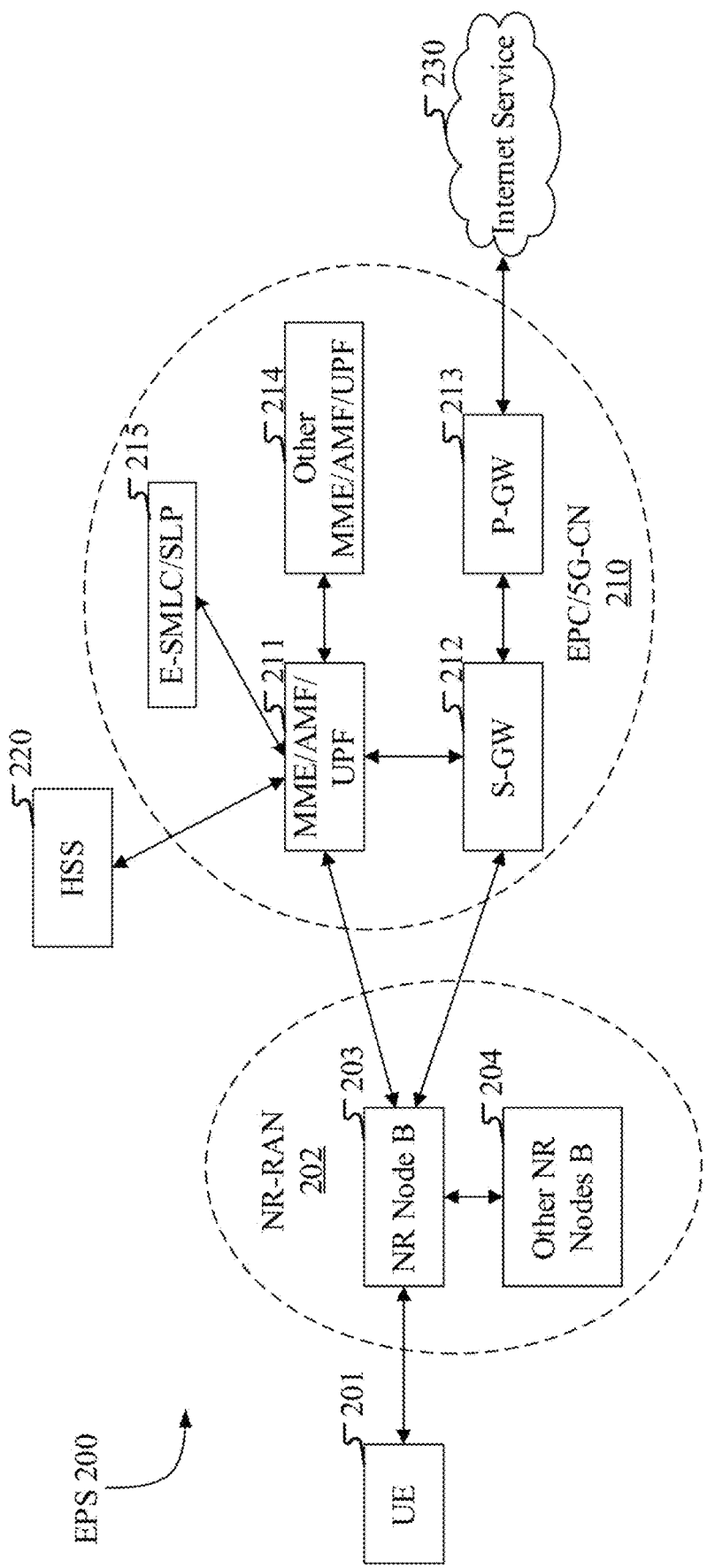
FIG. 2 shows a schematic diagram of network architecture in accordance with one embodiment of the present disclosure.

Embodiment 2 shows a schematic diagram of network architecture, as shown in FIG. 2.

Embodiment 2 illustrates a schematic diagram of a network architecture according to the present provides, as shown in FIG. 2.

FIG. 2 describes a system network structure 200 of NR 5G, LTE (long-term evolution) and LTE-A (long-term evolution advanced). The network architecture 200 of NR 5G or LTE may be referred to as an EPS (evolve packet system) 200 or some other suitable terminology. The EPS 200 may include one or more UEs 201, NG-RAN (radio access network) 202, 5G-CN (core network)/EPC (evolved packet core) 210, HSS (Home Subscriber Server) 220 and the internet service 230. EPS may be interconnected with other access networks, but for the sake of simplicity, these entities/interfaces are not shown. As shown in FIG. 2, the EPS provides the packet switching services. Those skilled in the art would find it easy to understand that the various concepts presented throughout this disclosure can be extended to networks or other cellular networks that provide circuit switched services. The NG-RAN includes an NR Node B (gNB) 203 and other gNBs 204. The gNB 203 provides user and control plane protocol termination for the UE 201. The gNB 203 can be connected to other gNBs 204 via an Xn interface (eg, a backhaul). The gNB 203 may also be referred to as a base station, a base transceiver station, a wireless base station, a wireless transceiver, a transceiver function, a basic service set (BSS), an extended service set (ESS), a TRP (transmission and reception point), or some other suitable terminology. The gNB 203 provides the UE 201 with an access point to the 5G-CN/EPC 210. In the embodiment, the UE 201 includes cellular telephones, smart phones, Session Initiation Protocol (SIP) phones, laptop computers, personal digital assistants (PDAs), satellite wirelesses, non-terrestrial base station communications, satellite mobile communications, global positioning systems, multimedia devices, video devices, digital audio player (e.g. MP3 players), cameras, game consoles, drones, aircrafis, narrowband physical network devices, machine type communication devices, land vehicles, cars, wearable devices, or any other similar to functional devices. A person skilled in the art may also refer to UE 201 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, remote terminal, handset, user agent, mobile client, client or some other suitable term. The gNB 203 is connected to the 5G-CN/EPC 210 through an S1/NG interface. 5G-CN/EPC 210 includes MME/AMF/UPF 211, other MME (Mobility Management Entity)/AMF (Authentication Management Field)/UPF (User Plane Function) 214, a S-GW (Service Gateway) 212 and a P-GW (Packet Date Network Gateway) 213. The MME/AMF/UPF 211 is a control node that handles signaling between the UE 201 and the 5G-CN/EPC 210. In general, MME/AMF/UPF 211 provides bearer and connection management. All User IP (Internet Protocol) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 includes an operator-compatible internet protocol service, and may specifically include the Internet, an intranet, an IMS (IP Multimedia Subsystem), and a PS Streaming Service (PSS). E-SMLC/SLP (Evolved Serving Mobile Location Center/SUPL Location Platform) 215 is used for positioning services of mobile devices.

In a sub-embodiment, the UE 201 corresponds to the UE in this disclosure.

In a sub-embodiment, the gNB 203 corresponds to the base station in this disclosure.

In a sub-embodiment, the E-SMLC/SLP 215 corresponds to the service center in this disclosure.

In a sub-embodiment, the UE 201 supports wireless positioning.

In a sub-embodiment, the gNB 203 supports wireless positioning.

In a sub-embodiment, the E-SMLC/SLP 215 supports wireless positioning.

In a sub-embodiment, the first information in present disclosure is generated by the E-SMLC/SLP 215 and received by the base station gNB 203 and forwarded to the E-SMLC/SLP 215.

In an exemplary embodiment of this sub-embodiment, the first information is transparent to the gNB 203.

In a sub-embodiment, the first measurement report in this disclosure is generated by the E-SMLC/SLP 215 and received and forwarded by the base station gNB 203 to the E-SMLC/SLP 215.

In an exemplary embodiment of this sub-embodiment, the first measurement report is transparent to the gNB 203.

Embodiment 3

Figure 3:
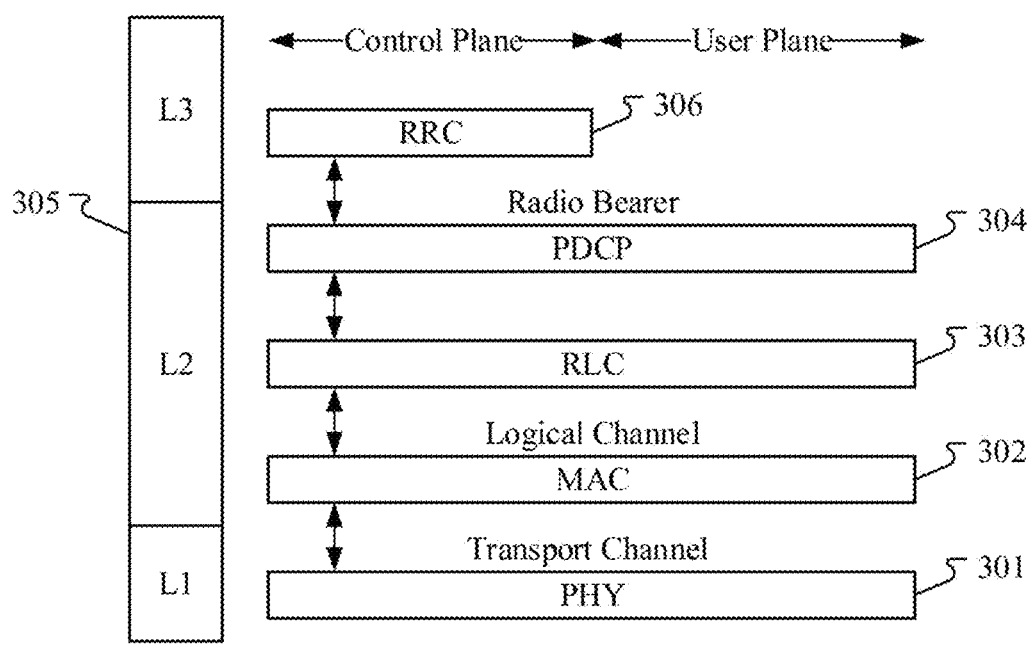
FIG. 3 shows a schematic diagram of a wireless protocol architecture of a user plane and a control plane in accordance with one embodiment of the present disclosure.

Embodiment 3 shows a schematic diagram of a wireless protocol architecture of a user plane and a control plane according to the present disclosure, as shown in FIG. 3.

FIG. 3 is a schematic diagram illustrating an embodiment of a wireless protocol architecture for a user plane and a control plane, and FIG. 3 shows a wireless protocol architecture for the user equipment (UE) and the base station equipment (gNB or eNB) in three layers: layer 1, layer 2 and layer 3. Layer 1 (L1 layer) is the lowest layer and implements various physical layer (PHY) signal processing functions, and layers above layer 1 belong to higher layers. The L1 layer will be referred to herein as PHY 301. Layer 2 (L2 layer) 305 is above PHY 301 and is responsible for the link between the UE and the gNB through PHY 301. In the user plane, L2 layer 305 comprises a media access control (MAC) sub-layer 302, a radio link control (RLC) sub-layer 303 and a packet data convergence protocol (PDCP) sub-layer 304, and these sub-layers terminate at the gNB on the network side. Although not illustrated, the UE may have several upper layers above the L2 layer 305, including a network layer (e.g. an IP layer) terminated at the P-GW on the network side and terminated at the other end of the connection (e.g. Application layer at the remote UE, server, etc.). The PDCP sub-layer 304 provides multiplexing between different wireless bearers and logical channels. The PDCP sublayer 304 also provides header compression for upper layer data packets to reduce wireless transmission overhead, and provides the security by encrypting data packets, and provides handoff support for UEs between gNBs. The RLC sublayer 303 provides segmentation and reassembly of upper layer data packets, retransmission of lost packets and the reordering of data packets to compensate for the disordered reception resulted by the hybrid automatic repeat request (HARQ). The MAC sublayer 302 provides multiplexing between the logical and transport channels. The MAC sublayer 302 is also responsible for allocating various wireless resources (e.g. resource blocks) in one cell between UEs. The MAC sublayer 302 is also responsible for HARQ operations. In the control plane, the wireless protocol architecture for the UE and gNB is substantially the same for the physical layer 301 and the L2 layer 305, but there is no header compression function for the control plane. The control plane also includes an RRC (Wireless Resource Control) sublayer 306 in Layer 3 (L3 layer). The RRC sublayer 306 is responsible for obtaining wireless resources (i.e. wireless bearers) and configuring the lower layer using RRC signaling between the gNB and the UE.

In a sub-embodiment, the wireless protocol architecture of FIG. 3 is applicable to the UE in this disclosure.

In a sub-embodiment, the wireless protocol architecture of FIG. 3 is applicable to the network device in this disclosure.

In a sub-embodiment, the first information in this disclosure is generated within the RRC sublayer 306.

In a sub-embodiment, the first measurement report in this disclosure is generated within the RRC sublayer 306.

Embodiment 4

Figure 4:
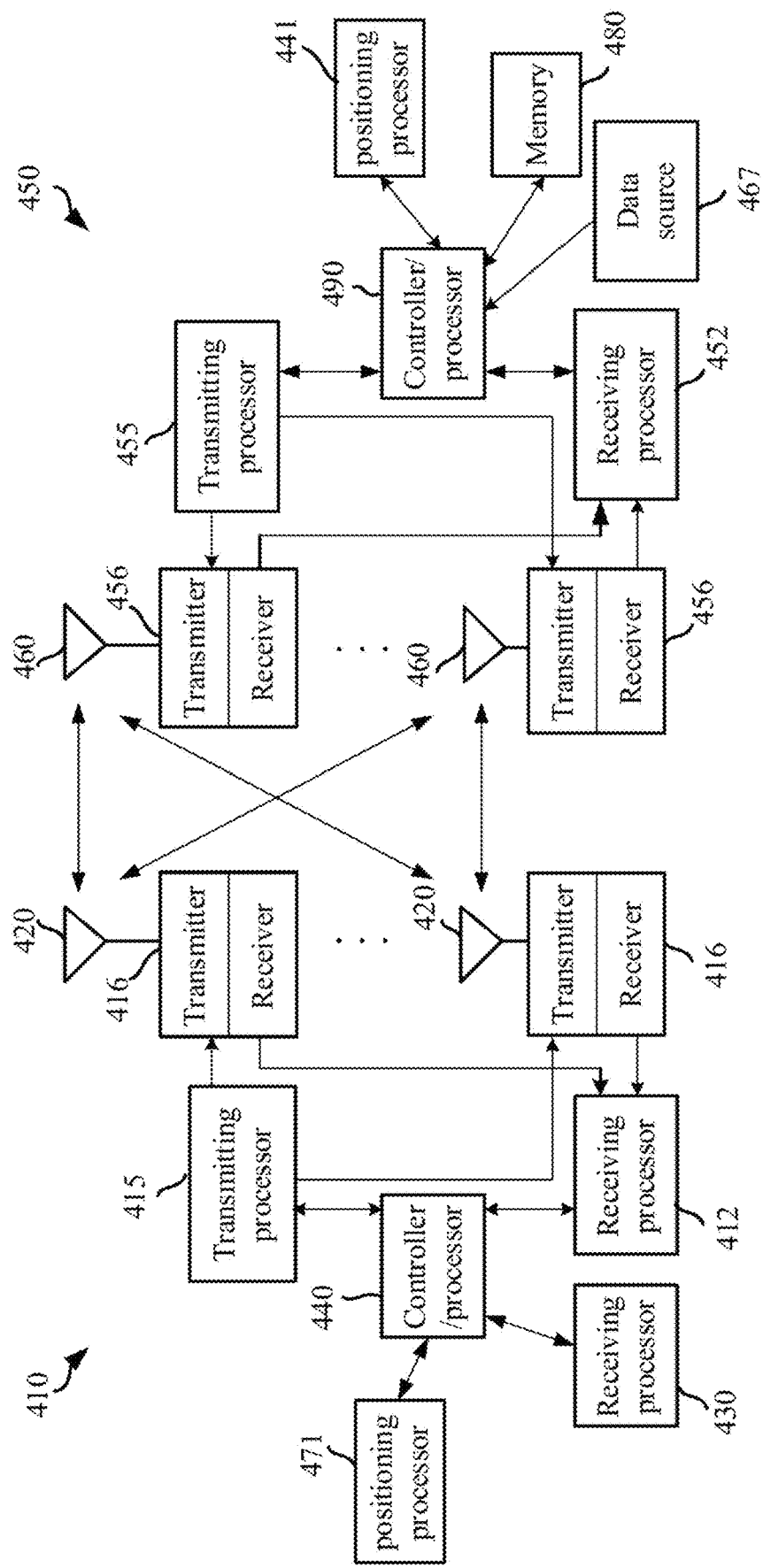
FIG. 4 shows a schematic diagram of an evolved node and a UE according to one embodiment of the present disclosure.

Embodiment 4 shows a schematic diagram of an evolved node and UE according to this disclosure, as shown in FIG. 4. The base station in this disclosure corresponds to the evolved node 410, or the evolved node device 410 described in the diagram corresponds to the service center in this disclosure; FIG. 4 is a block diagram of evolved node 410 in communication with the UE 450 in the access network.

The evolved node device (410) includes a controller/processor 440, a memory 430, a receiving processor 412, a transmitting processor 415, a positioning processor 471, a transmitter/receiver 416, and the antenna 420.

The UE (450) includes a controller/processor 490, a memory 480, a data source 467, a transmitting processor 455, a receiving processor 452, a positioning processor 441, a transmitter/receiver 456, and an antenna 460.

In the downlink transmission, the processing related to the evolved node device (410) includes:

A controller/processor 440, the upper layer packet arriving, the controller/processor 440 provides header compression, encryption, packet segmentation and reordering, and multiplexing and demultiplexing between the logical and transport channels to implement the L2 layer protocol for the user plane and the control plane; the upper layer packets may include data or control information, such as a DL-SCH (Downlink Shared Channel).

A controller/processor 440 associated with a memory 430 that storing program codes and data, which may be a computer readable medium;

A controller/processor 440, including a scheduling unit for transmission requirements, and a scheduling unit for scheduling air interface resource corresponding to the transmission requirement;

The positioning processor 471 determines the first information and the first measurement report; and sends the result to the controller/processor 440;

The transmit processor 415 receives the output bit stream of the controller/processor 440 and implements various signal transmission processing functions for the L1 layer (ie, the physical layer) including encoding, interleaving, scrambling, modulation, power control/allocation, and physics layer control signaling (including PBCH, PDCCH, PHICH, PCFICH, reference signal) generation, etc.;

A transmitter 416 is used to convert the baseband signals provided by the transmit processor 415 into radio frequency signals and transmit them via the antenna 420; each of the transmitters 416 samples the respective input symbol streams to obtain respective sampled signal streams. Each transmitter 416 performs further processing (eg, digital to analog conversion, amplification, filtering, upconversion, etc.) on the respective sample streams to obtain a downlink signal.

In the downlink transmission, the processing related to the UE (450) may include:

A receiver 456, which converse the radio frequency signal received through the antenna 460 into a baseband signal is provided to the receiving processor 452;

The receiving processor 452, which implements various signal receiving processing functions for the L1 layer (ie, the physical layer) including decoding, deinterleaving, descrambling, demodulation, and physical layer control signaling extraction, etc.

The positioning processor 441, which determines the first information and the first measurement report; and transmits the result to the controller/processor 490.

The controller/processor 490, which receives the bit stream output by the receiving processor 452, provides header decompression, decryption, packet segmentation and reordering, and multiplexing and demultiplexing between the logical and transport channels, and implements L2 layer protocol for user plane and control plane.

The controller/processor 490, which is associated with a memory 480 that stores program code and data, and the memory 480 may be a computer-readable medium.

In a sub-embodiment, the UE 450 includes: at least one processor and at least one memory, the at least one memory including computer program code; the at least one memory and the computer program code are used to operate with the processor together, the UE 450 at least: transmitting first information, receiving X1 first signals, and transmitting a first measurement report; the first information is(are) used to determine X1 first antenna ports, the X1 first antenna ports are respectively used to send the X1 first signals; the first measurement report includes K1 piece(s) of measurement information, and each of the K1 piece(s) of measurement information is for one of the X1 first signals; the measurement information is used to determine at least the first two of a set of corresponding time lengths, the first antenna port(s) and the first angle(s) correspondingly; the set of time lengths and the first angle are both associated with the first antenna port(s); the set of time lengths includes one or more time lengths; the recipient of the first information and the recipient of the measurement information are non-co-location; the X1 is a positive integer greater than 1, the K1 is a positive integer.

In a sub-embodiment, the UE 450 includes a memory storing a computer readable instruction program, the computer readable instruction program which generates an action when executed by the at least one processor, the action comprising: transmitting the first information, receiving X1 first signals, and transmitting a first measurement report; the first information is(are) used to determine X1 first antenna ports, and the X1 first antenna ports are respectively used to send the X1 first signals; the first measurement report includes K1 piece(s) of measurement information, each of the K1 piece(s) of measurement information is for one of the X1 first signals; the measurement information is used to determine at least the first two of a set of corresponding time lengths, the first antenna port(s) and the first angle(s) correspondingly; the set of time lengths and the first angle are both associated with the first antenna port(s); the set of time lengths includes one or more time lengths; the recipient of the first information and the recipient of the measurement information are non-co-location; the X1 is a positive integer greater than 1, the K1 is a positive integer.

In a sub-embodiment, the evolved node device 410 includes at least one processor and at least one memory, the at least one memory including computer program code; the at least one memory and the computer program code are used to operate with the at least one processor together. The evolved node device 410 at least: receiving first information, transmitting X1 first signals; the first information is used to determine X1 first antenna ports, and the X1 first antenna ports are respectively used for sending the X1 first signals; the first antenna ports correspond to the X1 pieces of first configuration information respectively; the first configuration information includes at least one of corresponding time frequency domain resource occupied by the first antenna port(s), transmitting antenna port, associated ID or a CP length corresponding to the transmitted signal correspondingly; the X1 is a positive integer greater than 1.

In a sub-embodiment, the evolved node device 410 includes: a memory storing a computer readable instruction program which generates an action when executed by at least one processor, and the action comprising: receiving first signal, transmitting X1 first signals; the first information is used to determine X1 first antenna ports, and the X1 first antenna port PTP1910872TW-TW_APP_FIG_V3 s are respectively used to send the X1 first signals; the X1 first antenna ports respectively correspond to the X1 pieces of first configuration information; the first configuration information includes at least one of corresponding time frequency domain resource occupied by the first antenna ports, transmitting antenna port, associated ID or a CP length corresponding to the transmitted signal correspondingly; the X1 is a positive integer greater than 1.

In a sub-embodiment, the evolved node device 410 includes: at least one processor and at least one memory, the at least one memory including computer program code; the at least one memory and the computer program code are used to operate with the at least one processor together. The evolved node device 410 at least: receiving second information, receiving first measurement report; the second information is(are) used to determine at least one of the X1 pieces of first configuration information and the X2 pieces of second configuration information; X1 pieces of first configuration information respectively correspond to X1 first antenna ports, and the X2 pieces of second configuration information respectively correspond to X2 second antenna ports; the X1 first antenna ports are respectively used to transmit the X1 first signals, the X2 second antenna ports are respectively used to transmit X2 second signals; the first configuration information includes at least one of corresponding time frequency domain resource occupied by the first antenna ports, transmitting antenna port(s), associated ID or a CP length corresponding to the transmitted signal correspondingly; the second configuration information includes at least one of corresponding time frequency domain resource occupied by the second antenna port, transmitting antenna port(s), associated ID or a CP length corresponding to the transmitted signal correspondingly; the first measurement report includes K1 piece(s) of measurement information, and each of the K1 piece(s) of measurement information is for one of the X1 first signals; the measurement information is(are) used to determine are least first two of a set of corresponding time lengths, the first antenna port(s) and the first angle(s) correspondingly; the set of time lengths and the first angle are both related to the first antenna port(s); the set of time lengths includes one or more time lengths; the transmitter of the second information and the transmitter of the first measurement report are non-co-location; the X1 and the X2 are both positive integers; and K1 is a positive integer.

In a sub-embodiment, the evolved node device 410 includes: a memory storing a computer readable instruction program which generates an action when executed by at least one processor, the action comprising: receiving the second information, receiving the first measurement report; the second information is used to determine at least one of the X1 pieces of first configuration information and the X2 pieces of second configuration information; the X1 pieces of first configuration information correspond to the X1 first The antenna ports respectively, and the X2 pieces of second configuration information correspond to the X2 second antenna ports respectively; the X1 first antenna ports are respectively used to transmit X1 first signals, and the X2 second signals are respectively used to transmit the X2 second signals; the first configuration information includes at least one of corresponding time frequency domain resource occupied by the first antenna port(s), transmitting antenna port(s), associated ID or a CP length corresponding to the transmitted signal correspondingly; the second configuration information includes at least one of corresponding time frequency domain resource occupied by the second antenna port(s), transmitting antenna port(s), associated ID or a CP length corresponding to the transmitted signal correspondingly; the first measurement reports includes K1 piece(s) of measurement information, each of the K1 piece(s) of measurement information is for one of the X1 first signals; the measurement information is(are) used determining at least the first two of a set of corresponding time lengths, the first antenna port(s) and the first angle(s) correspondingly; the set of time lengths and the first angle are both related to the first antenna ports; the set of time lengths includes one or more time lengths; the transmitter of the second information and the transmitter of the first measurement report are non-co-location; the X1 and the X2 are both positive integers; and K1 is a positive integer.

In a sub-embodiment, the UE 450 corresponds to the UE in this disclosure.

In a sub-embodiment, the evolved node device 410 corresponds to the base station in this disclosure.

In a sub-embodiment, the evolved node device 410 corresponds to the service center in this disclosure.

In a sub-embodiment, at least the first two of the transmitter 456, the transmit processor 455, and the controller/processor 490 are used to transmit at least the first two of the first information, the first measurement report, and the second measurement report.

In a sub-embodiment, one of the positioning processor 441 is used to determine at least one of the first information and the first measurement report.

In a sub-embodiment, at least the first two of the receiver 456, the receive processor 452, and the controller/processor 490 are used to receive at least one of X1 first signals, X2 second signals, first signaling, second signaling and X3 third signals.

In a sub-embodiment, at least the first two of the receiver 416, the receive processor 412, and the controller/processor 440 are used to receive the first information.

In a sub-embodiment, at least the first two of the transmitter 416, the transmit processor 415, and the controller/processor 440 are used to transmit at least one of X1 first signals, X2 second signals, second information, second signaling, X3 third signals and third information.

In a sub-embodiment, the positioning processor 441 is used to determine at least the first two of the second information, the first measurement report, and the second measurement report.

Embodiment 5

Figure 5:
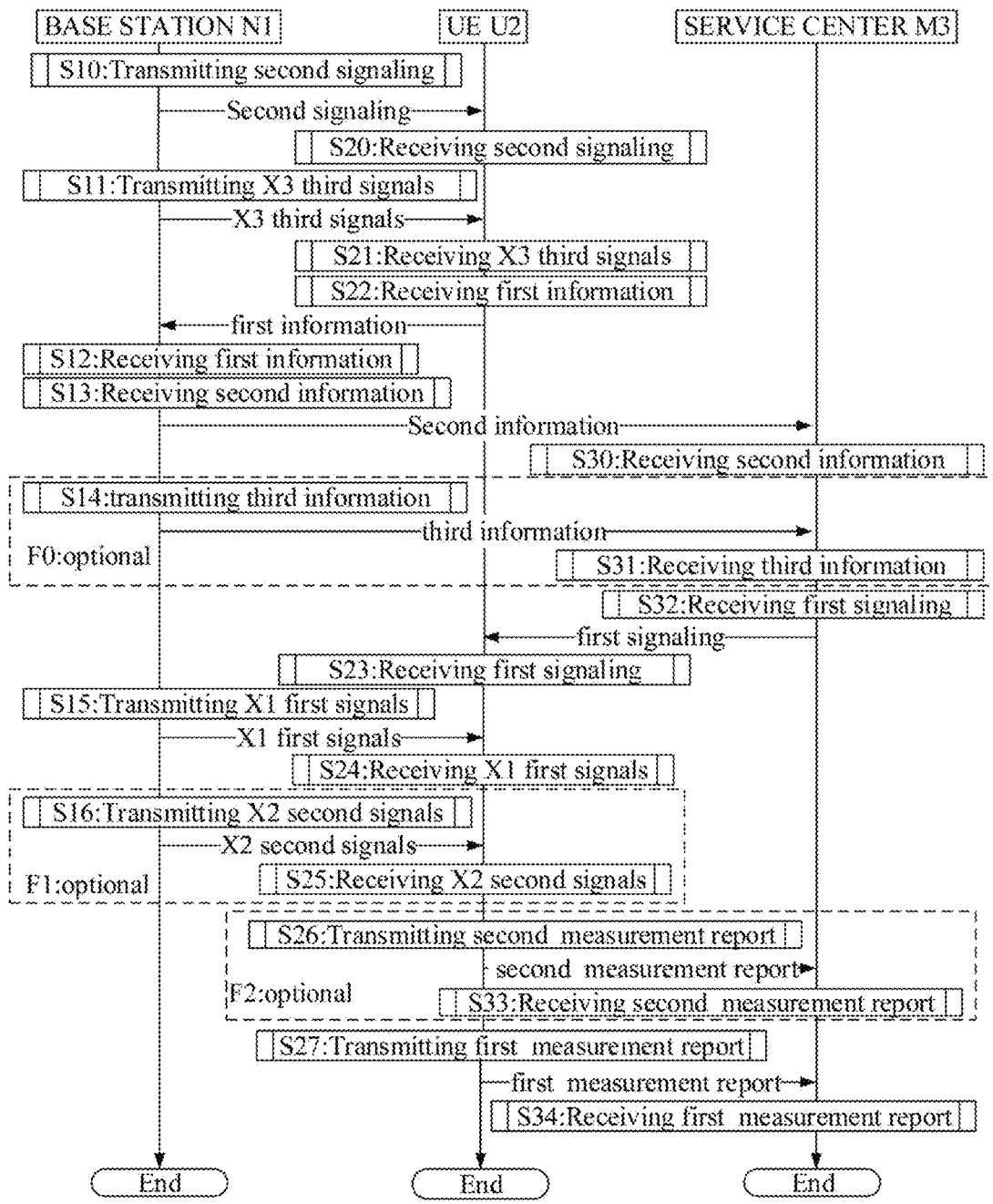
FIG. 5 shows a flowchart of first measurement report in accordance with one embodiment of the present disclosure.

Embodiment 5 illustrates a flow chart of a first measurement report transmission, as shown in FIG. 5. In FIG. 5, the base station N1 is a maintenance base station of the serving cell of the UE U2, and the service center M3 is a core network entity connected to the base station N1 for positioning. The steps identified by box F0 through box F2 are optional.

For the base station N1 transmits a second signaling in step S10; transmits X3 third signals in step S11; receives a first information in step S12; transmits a second information in step S13; transmits a third information in step S14; transmits X1 first signals in step S15s; and transmits X2 second signals in step S16.

The UE U2 receives a second signaling in step S20; receives X3 third signals in step S21s; transmits a first information in step S22; receives a first signaling in step S23; receives X1 first signals in step S24; receives X2 second signals in step S25; transmits a second measurement report in step S26; and transmits a first measurement report in step S27.

The service center M3, in step S30, receives a second information in step S30; receives a third information in step S31; transmits a first signaling in step S32; receives a second measurement report in step S33; and receives a first measurement report in step S34.

In Embodiment 5, the first information is used to determine X1 first antenna ports, and the X1 first antenna ports are respectively used to transmit the X1 first signals; the first measurement report includes K1 piece(s) of measurement information, each of the K1 piece(s) of measurement information is for one of the X1 first signals; the measurement information is used to determine at least the first two of a set of corresponding time lengths, the first antenna port(s) and the first angle(s) correspondingly; the set of time lengths and the first angle are both related to the first antenna port(s); the set of time lengths includes one or more time lengths; the receiver of the first information and the receiver of the first measurement report are non-co-location; the X1 is a positive integer greater than 1, and the K1 is a positive integer; the X2 second signals are respectively transmitted by the X2 second antenna ports, the first information is used to determine the X2 second antenna ports; each of the K1 piece(s) of measurement information is for one of the X2 second signals; the measurement information is used determining a second antenna port(s); the second antenna port(s) is(are) used to send the second signal corresponding to the measurement information; the set of time lengths and the second antenna port are associated; the X2 is positive integer; the first signaling is used to determine at least one of X1 pieces of first configuration information and X2 pieces of second configuration information; the X1 pieces of first configuration information correspond to the X1 first antenna ports respectively; the X2 pieces of second configuration information correspond to the X2 second antenna ports respectively; the first configuration information includes at least one of corresponding time frequency domain resource occupied by the first antenna port(s), transmitting antenna port(s), associated ID or a CP length corresponding to the transmitted signal correspondingly; the second configuration information includes at least one of corresponding time frequency domain resource occupied by the second antenna port, transmitting antenna port(s), associated ID or a CP length corresponding to the transmitted signal correspondingly; the second signaling is used to determine X3 pieces of third configuration information; the X3 third signals are respectively transmitted by X3 third antenna ports; the X3 pieces of third configurations information respectively correspond to the X3 third antenna ports; the third configuration information includes at least one of corresponding time frequency domain resource occupied by the third antenna port, transmitting antenna port(s), associated ID or a CP length corresponding to the transmitted signal correspondingly; the X3 is a positive integer greater than 1; the second measurement report includes at least one of X1 pieces of matching information and X2 pieces of matching information; the X1 pieces of matching information correspond to the X1 fourth antenna ports respectively, the X2 pieces of matching information correspond to the X2 fifth antenna ports respectively; the X1 fourth antenna ports are respectively used to receive the X1 first signals, and the X2 fifth antenna ports are respectively used to receive the X2 second signals; the matching information includes one of an identifier of the corresponding antenna port, a time domain resource allocated to the corresponding antenna port and a direction angle of the corresponding antenna port; the first signal is associated with first ID, the first ID is a positive integer; or the second signal is associated with second ID, the second ID is a positive integer; the time length is used to determine a difference between a received time of the associated first signal and a received time of the associated second signal.

In a sub-embodiment, the first measurement report is transmitted by the higher layer.

In a sub-embodiment, the first measurement report is transmitted by the User Plane.

In a sub-embodiment, the first measurement report is transmitted by the Control Plane.

In a sub-embodiment, the second measurement report is transmitted by the higher layer.

In a sub-embodiment, the second measurement report is transmitted by the user plane.

In a sub-embodiment, the second measurement report is transmitted by the control plane.

In a sub-embodiment, the second signaling is used at the physical layer.

Embodiment 6

Figure 6:
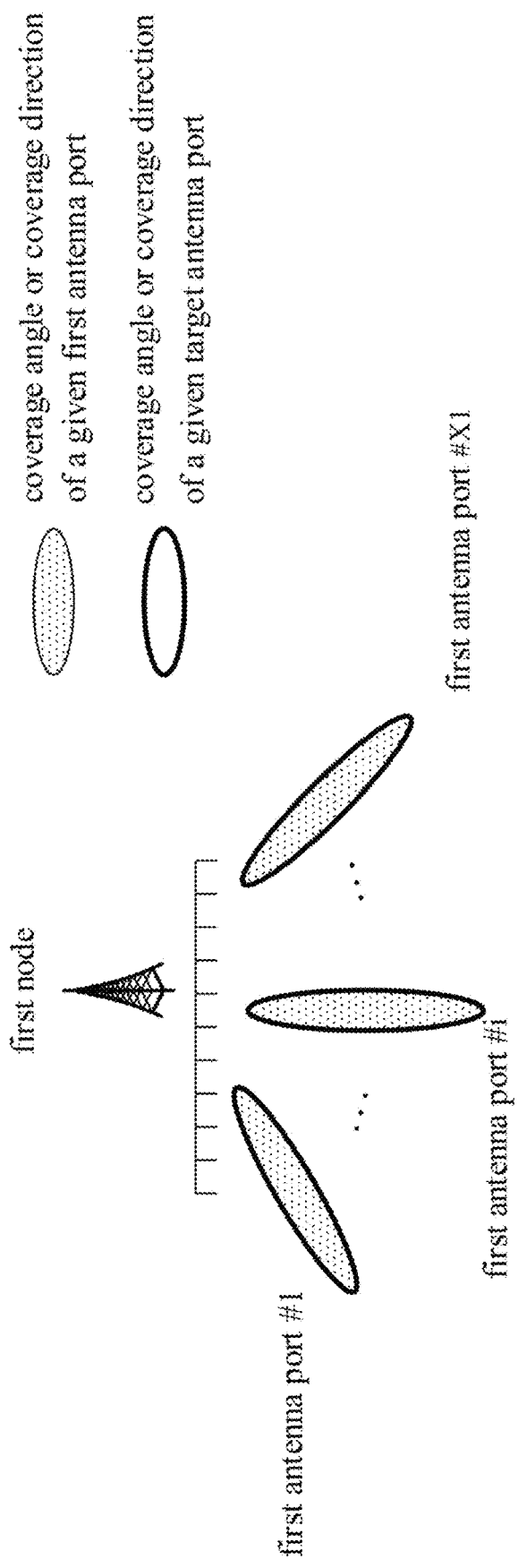
FIG. 6 shows a schematic diagram of first information and X1 first antenna ports according to one embodiment of the present disclosure.

Embodiment 6 illustrates a schematic diagram of first information and X1 first antenna ports. As shown in FIG. 6, the first information includes X1 target antenna ports. The X1 target antenna ports correspond to the X1 first antenna ports respectively. The i is a positive integer not less than 1 and not greater than X1. The X1 is a positive integer. The first information is for reporting information of X3 third antenna ports.

In a sub-embodiment, the angle covered by a given target antenna port is equal to the angle covered by a given first antenna port. The given target antenna port is any one of the X1 target antenna ports, and the given first antenna port is the first antenna port corresponding to the given target antenna port.

In a sub-embodiment, the direction covered by a given target antenna port is equal to the direction covered by a given first antenna port. The given target antenna port is any one of the X1 target antenna ports, and the given first antenna port is the first antenna port corresponding to the given target antenna port.

In a sub-embodiment, the first node is one of a base station, a TRP and a gNB.

In a sub-embodiment, the X1 target antenna ports belong to the X3 third antenna ports.

In a sub-embodiment, at least one of the X1 target antenna ports is composed of a positive integer number of the third antenna port. The positive integer number of the third antenna port belongs to the X3 third antenna ports.

In a sub-embodiment, the coverage angle or coverage direction of a given target antenna port includes a coverage angle or a coverage direction composed of a positive integer number of the third antenna port. The positive integer number of the third antenna port belongs to the X3 third antenna ports. The given target antenna port is any one of the X1 target antenna ports.

Embodiment 7

Figure 7:
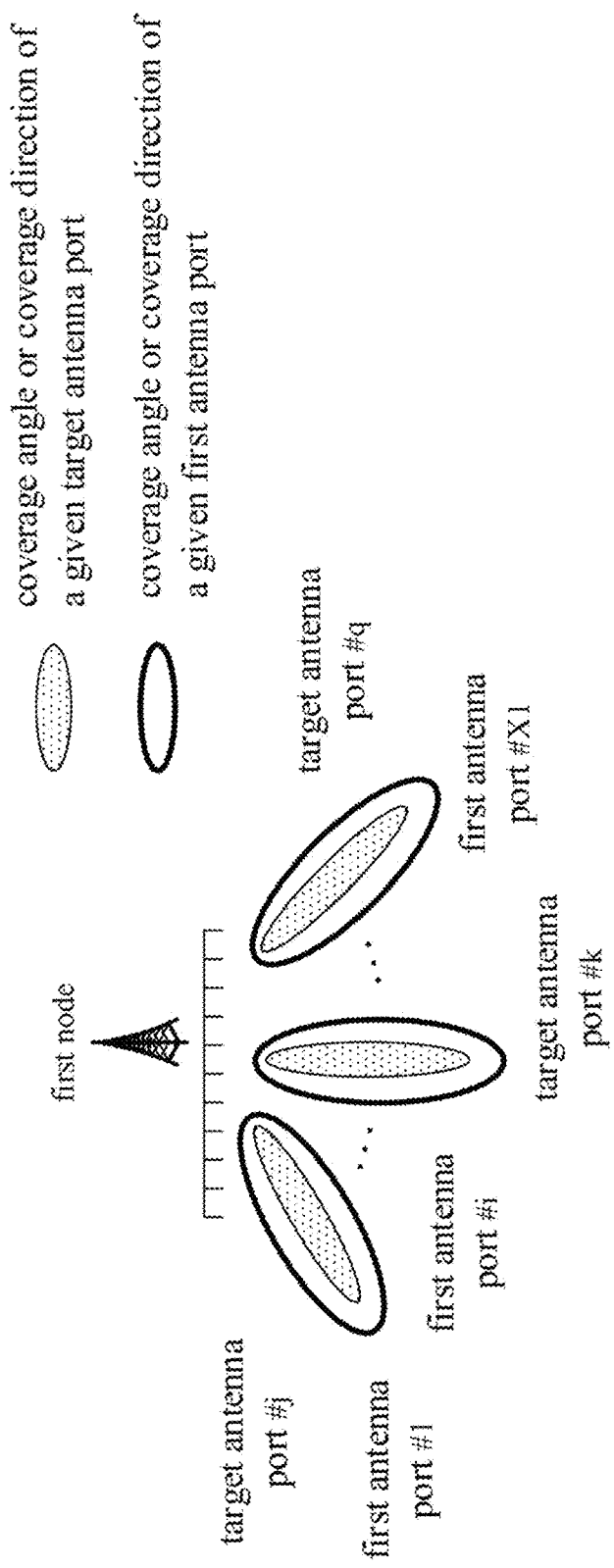
FIG. 7 shows a schematic diagram of first information and X1 first antenna ports according to another embodiment of the present disclosure.

Embodiment 7 illustrates a schematic diagram of another first information and X1 first antenna ports. As shown in FIG. 7, the first information includes Y1 target antenna port(s). The i is a positive integer not less than 1 and not greater than X1. The X1 is a positive integer. The j, k, and q are all positive integers not less than 1 and not greater than Y1. The Y1 is positive integer. The first information is for reporting information of X3 third antenna ports.

In a sub-embodiment, the angle covered by a given target antenna port belongs to the angle covered by a given first antenna port(s). The given target antenna port is any one of the Y1 target antenna ports, the given first antenna port(s) is one of the X1 first antenna ports and correspondence with the given target antenna port.

In a sub-embodiment, the direction covered by a given target antenna port belongs to the direction covered by a given first antenna port. The given target antenna port is any one of the Y1 target antenna ports, the given first antenna port is one of the X1 first antenna ports and corresponds to the given target antenna port.

In a sub-embodiment, the first node is one of a base station, a TRP and a gNB.

In a sub-embodiment, the Y1 target antenna port(s) belong to the X3 third antenna ports.

In a sub-embodiment, the coverage angle or coverage direction of a given target antenna port includes a coverage angle or coverage direction composed of a positive integer number of the third antenna port. The positive integer number of the third antenna port belongs to the X3 third antenna ports. The given target antenna port is any one of the Y1 target antenna port(s).

Embodiment 8

Figure 8:
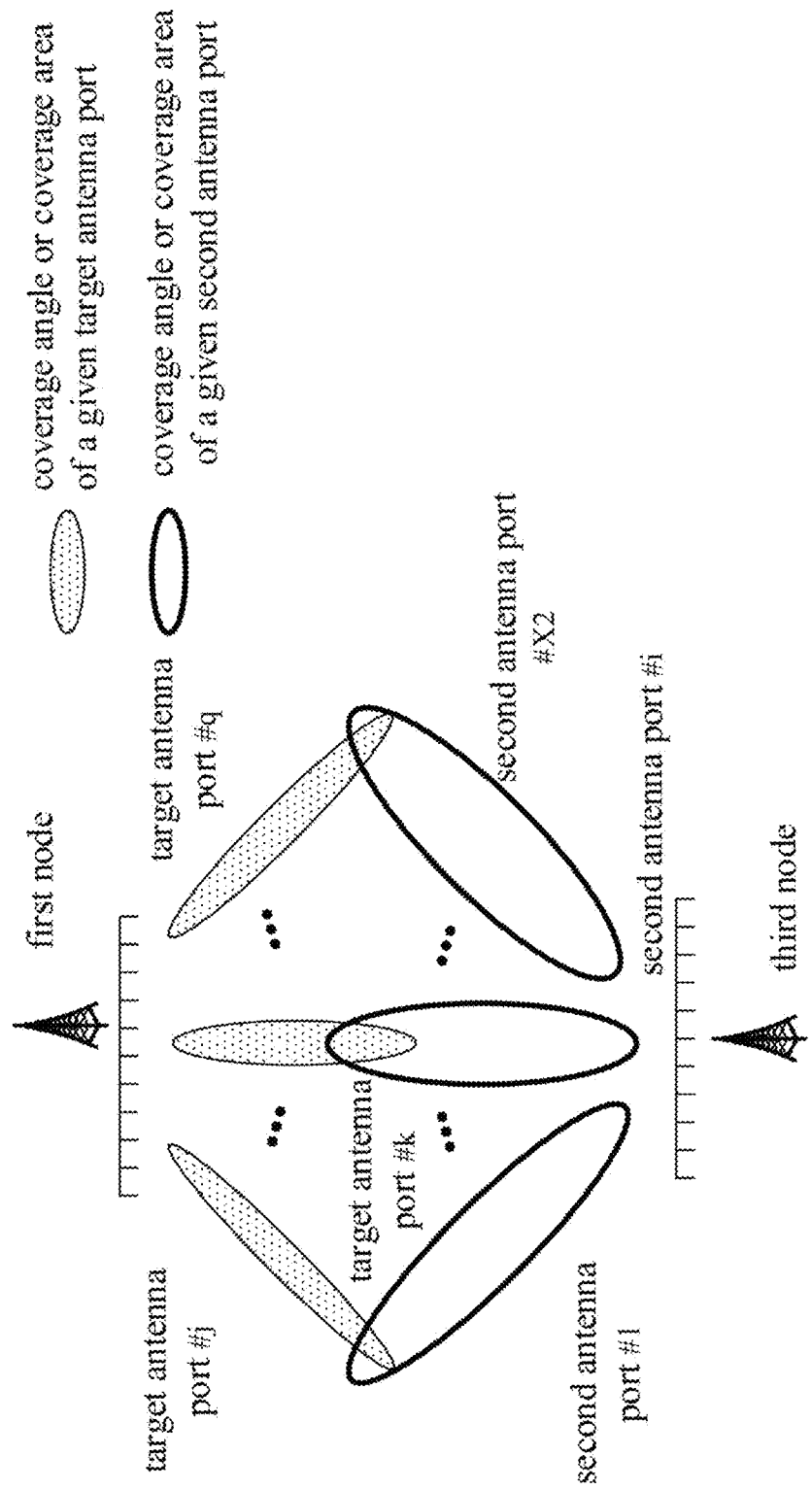
FIG. 8 shows a schematic diagram of first information and X2 second antenna ports according to one embodiment of the present disclosure.

Embodiment 8 illustrates a schematic diagram of first information and X2 second antenna ports. As shown in FIG. 8, the first information includes Y1 target antenna port(s). The i is a positive integer not less than 1 and not greater than X2. The X 2 is a positive integer. The f j, k and q are all positive integer not less than 1 and not greater than Y1. The Y1 is positive integer. The first information is for reporting information of X3 third antenna ports.

In a sub-embodiment, the angle covered by a given target antenna port intersects the angle covered by a given second antenna port. The given target antenna port is any one of the Y1 target antenna port(s), the given second antenna port is one of the X2 second antenna ports and correspondence with the given target antenna port.

In a sub-embodiment, the area covered by a given target antenna port intersects the area covered by a given second antenna port(s). The given target antenna port is any one of the Y1 target antenna port(s), the given second antenna port is one of the X2 second antenna ports and correspondence with the given target antenna port.

In a sub-embodiment, the first node is one of a base station, a TRP and a gNB.

In a sub-embodiment, the third node is one of a base station, a TRP and a gNB.

In a sub-embodiment, the first node and the third node are non-co-location.

In a sub-embodiment, the Y1 target antenna port(s) belongs to the X3 third antenna ports.

In a sub-embodiment, the coverage angle or coverage direction of a given target antenna port includes a coverage angle or coverage direction composed of a positive integer number of the third antenna ports. The positive integer number of the third antenna port belongs to the X3 third antenna ports. The given target antenna port is any one of the Y1 target antenna port(s).

Embodiment 9

Figure 9:
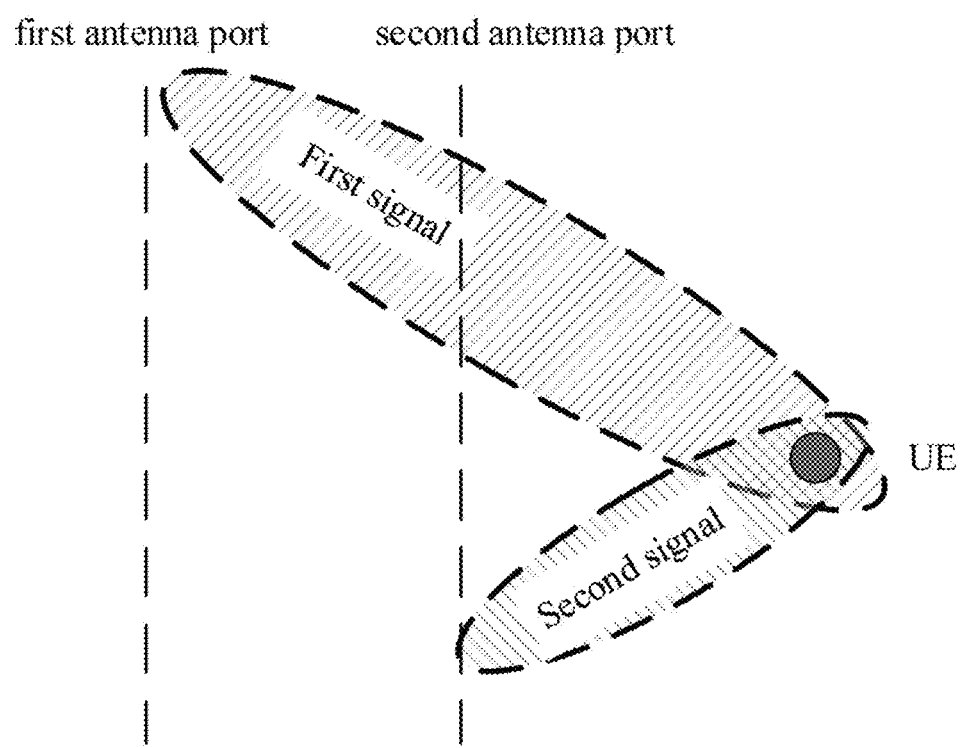
FIG. 9 shows a schematic diagram of the relationship between a first signal and a second signal according to one embodiment of the present disclosure.

Embodiment 9 illustrates a relationship between the first signal and the second signal, as shown in FIG. 9. In FIG. 9, the ellipse filled with slashes represents the first signal, and the ellipse filled with back slashes represents the second signal, and the dot in the area where the two ellipses intersect represents the UE that receives the first signal and the second signal. In Embodiment 9, the UE receives X1 first signals and X2 second signals, the X1 first signals are transmitted by X1 first antenna ports, and the X2 second signals are transmitted by X2 antenna ports, the X1 is a positive integer, and the X2 is a positive integer. The first signal is associated with a first ID, the first ID is a positive integer; or the second signal is associated with second ID, the second ID is a positive integer.

In a sub-embodiment, the first ID and the second ID are different.

In a sub-embodiment, the first ID and the second ID are equal.

In a sub-embodiment, the difference between the receiving time of the first signal and the receiving time of the second signal is a time length, and the UE transmits a first measurement report and the first measurement report includes the time length.

Embodiment 10

Figure 10:
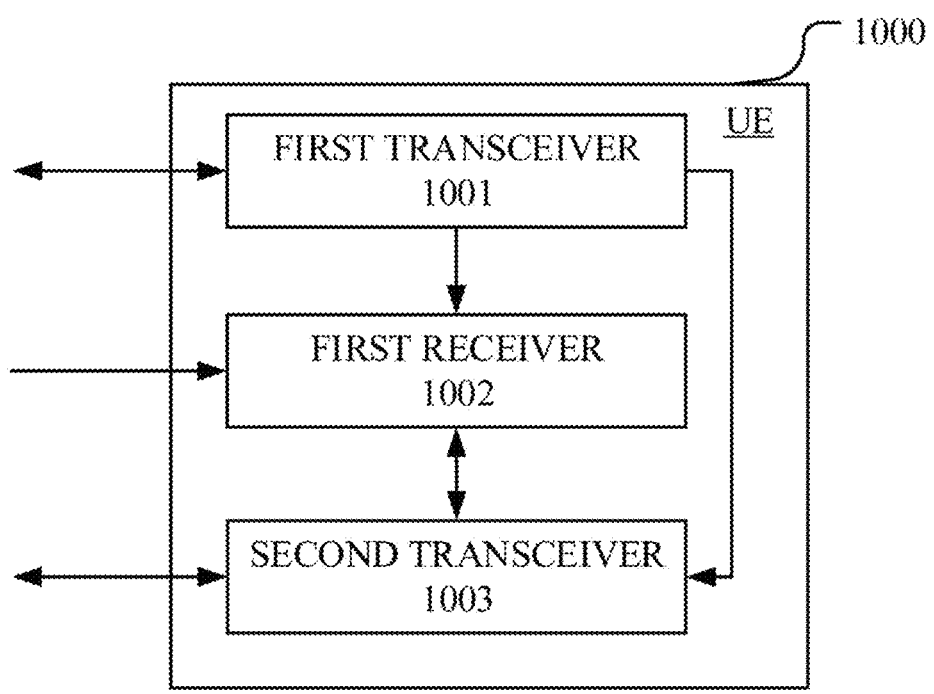
FIG. 10 shows a structure block diagram of a processing device in a UE according to one embodiment of the present disclosure.

Embodiment 10 illustrates a structural block diagram of a processing device in UE, as shown in FIG. 10. In FIG. 10, the UE processing device 1000 mainly comprises a first transceiver 1001, a first receiver 1002, and a second transceiver 1003.

a first transceiver 1001, transmitting first information;
a first receiver 1002, receiving X1 first signals; and
a second transceiver 1003, transmitting a first measurement report;

In Embodiment 10, the first information is used to determine X1 first antenna ports, and the X1 first signals are respectively transmitted by the X1 first antenna ports. The first measurement report includes K1 piece(s) of measurement information, and each of the K1 piece(s) of measurement information is for one of the X1 first signals; the K1 first signal(s) belongs to the X1 first signals; the measurement information is used determining at least the first two of a set of corresponding time lengths, the first antenna ports and the first angle(s) correspondingly; the set of time lengths and the first angle are both related to the first antenna ports; the set of time lengths includes one or more time lengths; the recipient of the first information and the recipient of the first measurement report are non-co-location; the X1 is a positive integer greater than 1, and K1 is a positive integer.

In a sub-embodiment, the first transceiver 1001 further receives second signaling and X3 third signals; the second signaling is used to determine X3 pieces of third configuration information; the X3 third signals are transmitted by the X3 third antenna ports; the X3 pieces of third configuration information correspond to the X3 third antenna ports respectively; the third configuration information includes at least one of corresponding time frequency domain resource occupied by the third antenna port, transmitting antenna port(s), associated ID or a CP length corresponding to the transmitted signal correspondingly; the X3 is a positive integer greater than 1.

In a sub-embodiment, the first receiver 1002 further receives X2 second signals; the X2 second signals are respectively transmitted by X2 second antenna ports, and the first information is used to determine the X2 second antenna ports; each of the K1 piece(s) of measurement information is for one of the X2 second signals; the measurement information is used to determine a second antenna port(s); The second antenna port(s) is(are) used to transmit the second signal corresponding to the measurement information; the set of time lengths and the second antenna port are associated. The X2 is a positive integer.

In a sub-embodiment, the second transceiver 1003 further receives first signaling; the first signaling is used to determine at least one of X1 pieces of first configuration information and X2 pieces of second configuration information; The X1 first configuration information correspond to the X1 first antenna ports respectively, and the X2 second configuration information correspond to the X2 second antenna ports respectively; the first configuration information includes at least one of corresponding time frequency domain resource occupied by the first antenna ports, transmitting antenna port(s), associated ID or a CP length corresponding to the transmitted signal; the second configuration information includes at least one of corresponding time frequency domain resource occupied by the second antenna port, transmitting antenna port(s), associated ID or a CP length corresponding to the transmitted signal correspondingly.

In a sub-embodiment, the second transceiver 1003 further transmits second measurement report; the second measurement report includes at least one of X1 pieces of matching information and X2 pieces of matching information; the X1 pieces of matching information correspond to the X1 fourth antenna ports respectively, and the X2 pieces of matching information correspond to the X2 fifth antenna ports respectively; the X1 fourth antenna ports are respectively used to receive the X1 first signals, the X2 fifth antenna ports are respectively used to receive the X2 second signals; the matching information includes one of an identifier of the corresponding antenna port, a time domain resource allocated to the corresponding antenna port and a direction angle of the corresponding antenna port.

In a sub-embodiment, the first transceiver 1001 includes at least the first three a receiver/transmitter 456, a receiving processor 452, a transmitting processor 455, a positioning processor 441, and a controller/processor 490 in Embodiment 4.

In a sub-embodiment, the first receiver 1002 includes at least the first two of a receiver 456, a receiving processor 452, and a controller/processor 490 in Embodiment 4.

In a sub-embodiment, the second transceiver 1003 includes at least the first four of a receiver/transmitter 456, a receiving processor 452, a transmitting processor 455, a positioning processor 441, and a controller/processor 490 in Embodiment 4.

Embodiment 11

Figure 11:
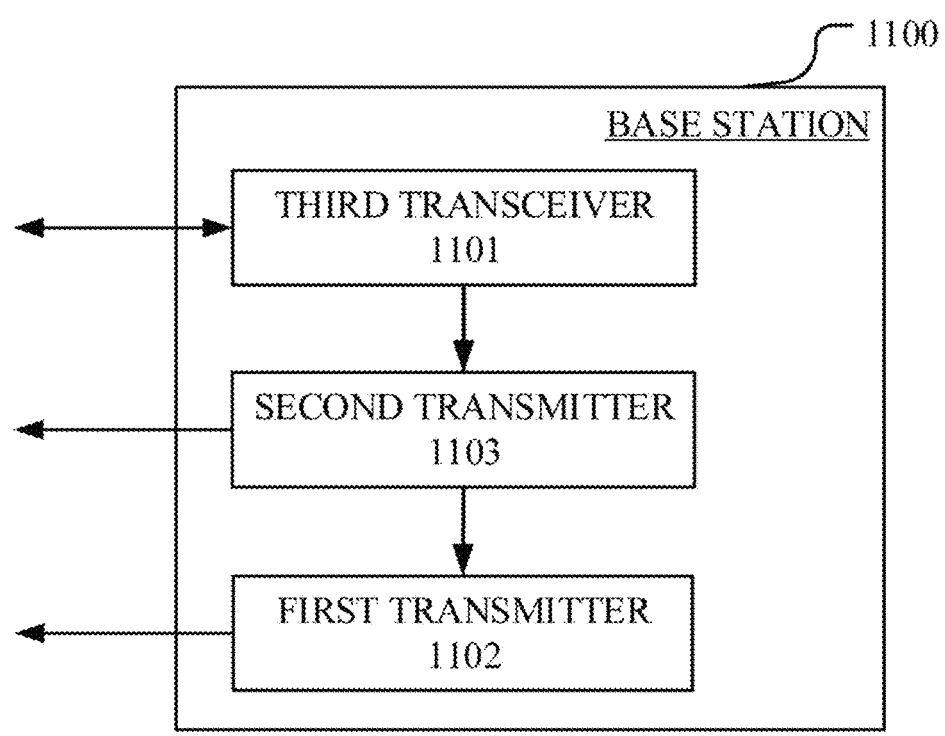
FIG. 11 shows a structure block diagram of a processing device in a base station according to one embodiment of the present disclosure.

Embodiment 11 illustrates a structure block diagram of a processing device in base station, as shown in FIG. 11. In FIG. 11, the base station processing device 1100 is primarily comprised of a third transceiver 1101, a first transmitter 1102, and a second transmitter 1103.

a third transceiver 1101, receiving first information;

a first transmitter 1102, transmitting X1 first signals; and a second transmitter 1103, transmitting second information;

In Embodiment 11, the first information is used to determine X1 first antenna ports, and the X1 first signals are transmitted respectively by the X1 first antenna ports. The X1 first antenna ports correspond to the X1 pieces of first configuration information respectively. The first configuration information includes at least one of corresponding time frequency domain resource occupied by the first antenna port(s), transmitting antenna port(s), associated ID or a CP length corresponding to the transmitted signal. The second information is used to determine at least the former of the X1 pieces of first configuration information and the X2 pieces of second configuration information.

In a sub-embodiment, the third transceiver 1101 further transmits second signaling and X3 third signals; the second signaling is used to determine X3 pieces of third configuration information; the X3 third signals are transmitted by the X3 third antenna ports; the X3 pieces of third configuration information correspond to the X3 third antenna ports respectively; the third configuration information includes at least one of corresponding time frequency domain resource occupied by the third antenna port, transmitting antenna port(s), associated ID or a CP length corresponding to the transmitted signal correspondingly; the X3 is a positive integer greater than 1.

In a sub-embodiment, the first transmitter 1102 is further used to transmit X2 second signals; the first information is used to determine X2 second antenna ports, and the X2 second signals are respectively transmitted by the X2 second antenna ports; the X2 second antenna ports correspond to the X2 pieces of second configuration information respectively; the second configuration information includes at least one of corresponding time frequency domain resource occupied by the second antenna port, transmitting antenna port(s), associated ID or a CP length corresponding to the transmitted signal correspondingly; the X2 is a positive integer greater than 1.

In a sub-embodiment, the second transmitter 1103 is further used to send third information, the third information includes the first ID, the association information of the first ID, the second ID, and the association information of the second ID, the association information includes at least one of a corresponding geographic location coordinate, a corresponding timing information, a corresponding carrier frequency, a maximum continuous time interval that can be allocated, and a corresponding CP length.

In a sub-embodiment, the third transceiver 1101 includes at least the first three of a receiver/transmitter 416, a transmit processor 415, a receive processor 412, a positioning processor 471, and a controller/processor 440 in Embodiment 4.

In a sub-embodiment, the first transmitter 1102 includes at least the first two of the transmitter 416, the transmit processor 415, and the controller/processor 440 in Embodiment 4.

In a sub-embodiment, the second transmitter 1103 includes at least the first three of the transmitter 416, the transmit processor 415, and the controller/processor 440 in Embodiment 4.

Embodiment 12

Figure 12:
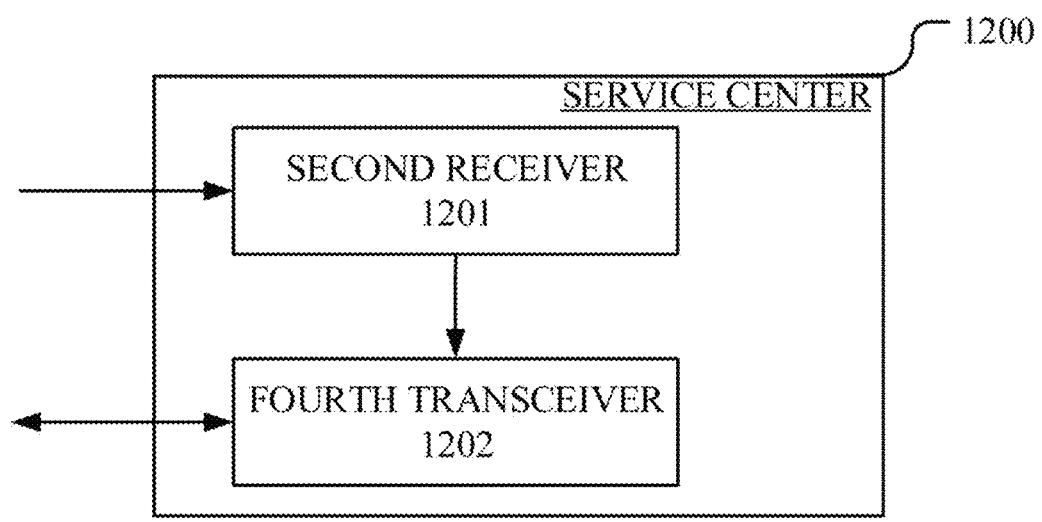
FIG. 12 shows a structural block diagram of a processing device in a service center according to one embodiment of the present disclosure.

Embodiment 12 illustrates a structural block diagram of a processing device in a service center, as shown in FIG. 12. In FIG. 12, the service center processing device 1200 includes a second receiver 1201 and a fourth transceiver 1202.

A second receiver 1201 receives second information.

A fourth transceiver 1202, receives a first measurement report.

In Embodiment 12, the second information is used to determine at least one of X1 pieces of first configuration information and X2 pieces of second configuration information; the X1 pieces of first configuration information correspond to X1 first antenna ports respectively, the X2 pieces of second configuration information correspond to X2 second antenna ports respectively; the X1 first antenna ports are respectively used to transmit X1 first signals, and the X2 second antenna ports are respectively used to transmit the X2 second signals; the first configuration information includes at least one of corresponding time frequency domain resource occupied by the first antenna ports, transmitting antenna port(s), associated ID or a CP length corresponding to the transmitted signal correspondingly; the second configuration information includes at least one of corresponding time frequency domain resource occupied by the second antenna port, transmitting antenna port(s), associated ID or a CP length corresponding to the transmitted signal. A measurement report includes K1 piece(s) of measurement information, each of the K1 piece(s) of measurement information is for one of the X1 first signals; the measurement information is(are) used to determine at least the first two of a set of corresponding time lengths, the first antenna ports and the first angle(s) correspondingly; the set of time lengths and the first angle are both related to the first antenna port(s); the set of time lengths includes one or more time lengths; the transmitter of the second information and the transmitter of the first measurement report are non-colocation; the X1 and the X2 are both positive integers; and K1 is a positive integer.

In a sub-embodiment, the second receiver 1201 further receives third information; the third information includes the first ID, the association information of the first ID, the second ID, and the association information of the second ID, the association information includes at least one of a corresponding geographic location coordinate, a corresponding timing information, a corresponding carrier frequency, a maximum continuous time interval that can be allocated, and a corresponding CP length.

In a sub-embodiment, the fourth transceiver 1202 further transmits first signaling, where the first signaling is used to determine at least one of the X1 pieces of first configuration information and the X2 pieces of second configuration information.

In a sub-embodiment, the fourth transceiver 1202 further receives a second measurement report; the second measurement report includes at least one of X1 pieces of matching information and X2 pieces of matching information; the X1 pieces of matching information correspond to the X1 fourth antenna ports respectively, and the X2 pieces of matching information correspond to the X2 fifth antenna ports respectively; the X1 fourth antenna ports are respectively used to receive the X1 first signals, the X2 fifth antenna ports are respectively used to receive the X2 second signals; the matching information includes one of an identifier of the corresponding antenna port, a time domain resource allocated to the corresponding antenna port and a direction angle of the corresponding antenna port.

In a sub-embodiment, the second receiver 1201 includes at least the first two of the receiver 416, the receiving processor 412, and the controller/processor 440 in Embodiment 4.

In a sub-embodiment, the fourth transceiver 1202 includes at least the first four of the receiver/transmitter 416, the transmit processor 415, the receive processor 412, the positioning processor 471, and the controller/processor 440 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in hardware form or in the form of a software function module. The disclosure is not limited to any specific combination of software and hardware. The UE and the terminal in the present disclosure include but are not limited to mobile phones, tablet computers, notebooks, vehicle communication devices, wireless sensors, network cards, Internet of things terminals (IOT), RFID terminals, NB-IOT terminals, and MTC (Machine Type Communication), terminals, eMTC (enhanced MTC) terminals, data cards, low-cost mobile phones, low-cost tablets and other wireless communication devices. The base station in the present disclosure includes but is not limited to macro-cellular base stations, micro cellular base stations, home base stations, relay base stations, and other communication equipment.

The above are only the preferred embodiment of the present disclosure and are not intended to limit the scope of the present disclosure, any modification, equivalent substitute and improvement made within the spirit and principle of this disclosure should be included within the scope of protection of the present disclosure.

The invention claimed is:

1. A method for positioning in a user equipment (UE), comprising:
   transmitting first information to a base station;
   receiving X1 first signals from the base station; and
   transmitting a first measurement report to a service center;
   wherein the first information is used by the base station to determine X1 first antenna ports, and the X1 first antenna ports are respectively used by the base station to transmit the X1 first signals; the first measurement report includes K1 piece(s) of measurement information which is used for a particular first signal of the X1 first signals; the measurement information is used to determine at least the first two of a set of time lengths, first antenna port(s) or a first angle correspondingly; the set of the time lengths and the first angle are both related to the first antenna port(s); the set of time lengths comprises one or more time lengths; a receiver of the first information and a receiver of the first measurement report are non-co-location; X1 is a positive integer greater than 1, and K1 is a positive integer; the measurement information includes a first type of channel quality, and the first signal corresponding to the measurement information is used to determine the first type of channel quality; the first type of channel quality includes Reference Signal Received Power.

2. A method used for positioning in a base station, comprising:

receiving first information from a user equipment (UE); and transmitting X1 first signals to the UE;

wherein the first information is used to determine X1 first antenna ports, and the X1 first antenna ports are respectively used to transmit the X1 first signals; the X1 first antenna ports correspond to X1 pieces of first configuration information respectively; the first configuration information comprises at least one of time-frequency domain resources occupied by the corresponding first antenna port(s), transmit antenna port(s), an associated ID, or a Cyclic Prefix(CP) length corresponding to the transmitted signal correspondingly; and X1 is a positive integer greater than one.

3. A method used for positioning in a service center, comprising:

receiving second information from a base station; and receiving a first measurement report from a user equipment;

wherein the second information is used to determine at least one of X1 pieces of first configuration information or X2 pieces of second configuration information; the X1 pieces of first configuration information respectively correspond to X1 first antenna ports; the X2 pieces of second configuration information correspond to X2 second antenna ports respectively; the first configuration information includes at least one of time-frequency domain resources occupied by the corresponding first antenna port(s), transmit antenna port(s), an associated ID, or a Cyclic Prefix(CP) length corresponding to the transmitted signal; the second configuration information includes at least one of time-frequency domain resources occupied by the corresponding second antenna port(s), transmit antenna port(s), an associated ID, or a CP length corresponding to the transmitted signal; the first measurement report includes K1 piece(s) of measurement information, which is used for a particular first signal of the X1 first signals; the measurement information is used to determine at least two of a set of time lengths, first antenna port(s) or a first angle correspondingly; the set of time lengths and the first angle are both related to the first antenna port(s); the set of time lengths includes one or more time lengths; X1 and X2 are both positive integers, and K1 is a positive integer; the measurement information includes a first type of channel quality, and the first signal corresponding to the measurement information is used to determine the first type of channel quality; the first type of channel quality includes Reference Signal Received Power.

4. A UE used for positioning, comprising:

a first transceiver, transmitting first information to a base station;

a first receiver, receiving X1 first signals from the base station; and a second transceiver, transmitting a first measurement report to a service center;

wherein the first information is used by the base station to determine X1 first antenna ports, and the X1 first antenna ports are respectively used by the base station to transmit the X1 first signals; the first measurement report includes K1 piece(s) of measurement information which is used for a particular first signal of the X1 first signals; the K1 first signal(s) belong to the X1 first signals; the measurement information is used to determine at least the first two of a set of time lengths, first antenna port(s) or a first angle correspondingly; the set of time lengths and the first angle are both related to the first antenna port(s); the set of time lengths includes one or more of time lengths; a receiver of the first information and a receiver of the first measurement report are non-co-location; X1 is a positive integer greater than 1, and K1 is a positive integer; the measurement information includes a first type of channel quality, and the first signal corresponding to the measurement information is used to determine the first type of channel quality; the first type of channel quality includes Reference Signal Received Power.

5. The UE according to claim 4, wherein before the first transceiver transmits the first information to the base station and the first receiver receives the X1 first signals from the base station, the first transceiver receives X2 second signals; the X2 second signals are respectively transmitted by X2 second antenna ports, and the first information is for determining the X2 second antenna ports; each of the K1 piece(s) of measurement information is for one second signal of the X2 second signals; the measurement information is used to determine second antenna port(s); the second antenna port(s) is(are) used to transmit the second signal corresponding to the measurement information; the set of the time lengths and the second antenna port(s) are associated; and X2 is a positive integer.

6. The UE according to claim 4, wherein the second transceiver receives a first signaling; the first signaling is used to determine at least one of X1 pieces of first configuration information or X2 pieces of second configuration information; the X1 pieces of first configuration information correspond to the X1 first antenna ports respectively, and the X2 pieces of second configuration information correspond to the X2 second antenna ports respectively; the first configuration information includes at least one of time-frequency domain resources occupied by the first antenna port(s), transmit antenna port(s), an associated ID, or a Cyclic Prefix(CP) length corresponding to the transmitted signal correspondingly; the second configuration information includes at least one of time-frequency domain resources occupied by the second antenna port(s), transmit antenna port(s), an associated ID, or a Cyclic Prefix(CP) length corresponding to the transmitted signal correspondingly.

7. The UE according to claim 4, wherein the first transceiver receives a second signaling and X3 third signals; the second signaling is used to determine X3 pieces of third configuration information; the X3 third signals are respectively transmitted in the X3 third antenna ports; the X3 pieces of third configuration information correspond to the X3 third antenna ports respectively; the third configuration information comprises at least one of time-frequency domain resources occupied by corresponding third antenna port(s), transmit antenna port(s), an associated ID, or a Cyclic Prefix(CP) length corresponding to the transmitted signal; the X3 is a positive integer greater than 1.

8. The UE according to claim 4, wherein the second transceiver transmit a second measurement report; the second measurement report includes at least one of X1 pieces of matching information or X2 pieces of matching information; The X1 pieces of matching information correspond to X1 fourth antenna ports respectively, and the X2 pieces of matching information correspond to X2 fifth antenna ports respectively; the X1 fourth antenna ports are respectively used to receive the X1 firsts signals, the X2 fifth antenna ports are respectively used to receive the X2 second signals; the matching information comprises at least one of an identifier of corresponding antenna port, time domain resources allocated to the corresponding antenna port, or a direction angle of the corresponding antenna port.

9. The UE according to claim 5, wherein the first signal is associated with a first ID, the first ID is a positive integer; or the second signal is associated with a second ID, the second ID is a positive integer;
or the time length is used to determine a difference between reception time of associated the first signal and reception time associated the second signal.

10. A base station used for positioning, comprising:
a third transceiver, receiving first information from a user equipment;
a first transmitter, transmitting X1 first signals to the user equipment; and
a second transmitter, transmitting second information to a service center;
wherein the first information is used to determine X1 first antenna ports, and the X1 first antenna ports are respectively used to transmit the X1 first signals; the X1 first antenna ports correspond to X1 pieces of first configuration information respectively; the first pieces of configuration information includes at least one of time-frequency domain resources occupied by the corresponding first antenna port, transmit antenna port(s), an associated ID, or a CP length corresponding to the transmitted signal; the second information is used to determine at least the former of the X1 pieces of first configuration information or the X2 pieces of second configuration information.

11. The base station according to claim 10, wherein the first transmitter transmits X2 second signals; the first information is used to determine X2 second antenna ports, the X2 second antenna ports are respectively used to transmit the X2 second signals; the X2 second antenna ports are correspond to the X2 pieces of second configuration information respectively; the second configuration information includes at least one of time-frequency domain resources occupied by the corresponding second antenna port, transmit antenna port(s), an associated ID, or a Cyclic Prefix(CP) length corresponding to the transmitted signal; X2 is a positive integer greater than one.

12. The base station according to claim 10, wherein the third transceiver transmits second signaling and transmits X3 third signals; the second signaling is used to determine X3 pieces of third configuration information; the X3 third signals are transmitted in X3 third antenna ports; the X3 pieces of third configuration information correspond to the X3 third antenna ports respectively; the third configuration information includes at least one of time-frequency domain resources occupied by third antenna port(s), transmit antenna port, an associated ID, or a Cyclic Prefix(CP) length corresponding to the transmitted signal correspondingly; the X3 is a positive integer greater than 1.

13. The base station according to claim 11, wherein the first signal is associated with a first ID, the first ID is a positive integer; or the second signal is associated with a second ID, the second ID is a positive integer; or the second information includes the first information.

14. The base station according to claim 13, wherein the second transceiver transmits third information; the third information includes the first ID, association information of the first ID, the second ID and the association information of the second ID, the association information comprises at least one of corresponding geographic location coordinate, corresponding timing information, corresponding carrier frequency, maximum continuous time interval that can be allocated, or corresponding Cyclic Prefix(CP) length; or the third information includes the first information.

15. A service center used for positioning, comprising:
a second receiver, receiving second information from a base station; and
a fourth transceiver, receiving a first measurement report from a user equipment;
wherein the second information is used to determine at least one of X1 pieces of first configuration information or X2 pieces of second configuration information; the X1 pieces of first configuration information correspond to the X1 first antenna ports respectively; the X2 pieces of second configuration information correspond to X2 second antenna ports respectively; the first configuration information includes at least one of time-frequency domain resources occupied by the corresponding first antenna port(s), transmit antenna port(s), an associated ID, or a Cyclic Prefix(CP) length corresponding to the transmitted signal; the second configuration information comprises at least one of time-frequency domain resources occupied by the corresponding second antenna port(s), transmit antenna port(s), an associated ID, or a Cyclic Prefix(CP) length corresponding to the transmitted signal; the first measurement report includes K1 piece(s) of measurement information, which is used for a particular first signal of the X1 first signals; the measurement information is used to determine at least first two of a set of time lengths, the first antenna port(s) and a first angle; the set of time lengths and the first angle are both related to the first antenna port(s); the set of time lengths includes one or more time lengths; X1 and X2 are both positive integers, and K1 is a positive integer; the measurement information includes a first type of channel quality, and the first signal corresponding to the measurement information is used to determine the first type of channel quality; the first type of channel quality includes Reference Signal Received Power.

16. The service center according to claim 15, wherein the fourth transceiver transmits first signaling; the first signaling is used to determine at least one of the X1 pieces of first configuration information or X2 pieces of second configuration information.

17. The service center according to claim 15, wherein the fourth transceiver receives a second measurement report; the second measurement report includes at least one of X1 pieces of matching information or X2 pieces of matching information; the X1 pieces of matching information correspond to X1 fourth antenna ports respectively, and the X2 pieces of matching information correspond to X2 fifth antenna ports respectively; the X1 fourth antenna ports are respectively used to receive the X1 first signals, the X2 fifth antenna ports are respectively used to receive the X2 second signals; the matching information comprises at least one of an identifier of corresponding antenna port, time domain resources allocated to the corresponding antenna port, and a direction angle of the corresponding antenna port.

18. The service center according to claim 15, wherein each of the K1 piece(s) of measurement information is for one of the X2 second signals; the measurement information is used for determining a second antenna port(s); the second antenna port(s) is(are) used to transmit the second signal corresponding to the measurement information; the set of time lengths and the second antenna port(s) are associated; or the first signal is associated with a first ID, the first ID is a positive integer; or the second signal is associated with a second ID, the second ID is a positive integer;

or the time length is used to determine a difference between reception time of associated the first signal and reception time of associated the second signal.

19. The service center according to claim 18, wherein the second receiver receives third information; the third information comprises the first ID, associated information of the first ID, the second ID and associated information of the second ID; the association information includes at least one of corresponding geographic location coordinate, corresponding timing information, corresponding carrier frequency, maximum continuous time interval that can be allocated, or corresponding CP length.

20. The service center according to claim 19, wherein the second information comprises first information; or the third information comprises first information; the first information is used to determine at least the former of the X1 first antenna ports or the X2 second antenna ports; a transmitter of the first information and a transmitter of the first measurement report are co-location.

* * * * *